US011297301B2

(12) United States Patent
Itakura

(10) Patent No.: US 11,297,301 B2
(45) Date of Patent: Apr. 5, 2022

(54) IMAGE CAPTURING SYSTEM, ARRANGEMENT DETERMINATION APPARATUS, ARRANGEMENT DETERMINATION METHOD, AND STORAGE MEDIUM

(71) Applicant: CANON KABUSHIKI KAISHA, Tokyo (JP)

(72) Inventor: Kina Itakura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/126,979

(22) Filed: Dec. 18, 2020

(65) Prior Publication Data
US 2021/0136349 A1    May 6, 2021

Related U.S. Application Data

(63) Continuation of application No. PCT/JP2019/024218, filed on Jun. 19, 2019.

(30) Foreign Application Priority Data

Jun. 27, 2018  (JP) .............. JP2018-121985
Jun. 27, 2018  (JP) .............. JP2018-122420

(51) Int. Cl.
*H04N 13/282*   (2018.01)
*H04N 13/25*    (2018.01)
(Continued)

(52) U.S. Cl.
CPC ......... *H04N 13/282* (2018.05); *H04N 13/111* (2018.05); *H04N 13/243* (2018.05); *H04N 13/25* (2018.05)

(58) Field of Classification Search
CPC .... H04N 13/282; H04N 13/25; H04N 13/243; H04N 13/111; H04N 5/247; H04N 5/232; G06T 15/20; G06T 1/00; G03B 15/00
(Continued)

(56) References Cited

U.S. PATENT DOCUMENTS

| 10,824,895 | B2 | 11/2020 | Itakura | |
|---|---|---|---|---|
| 2010/0039502 | A1* | 2/2010 | Robinson | H04N 13/239 348/47 |
| 2012/0114224 | A1* | 5/2012 | Xu | H04N 13/282 382/154 |
| 2014/0071234 | A1* | 3/2014 | Millett | G01S 17/894 348/43 |

(Continued)

FOREIGN PATENT DOCUMENTS

| JP | 2010-154052 A | 7/2010 |
|---|---|---|
| JP | 2012-185772 A | 9/2012 |

(Continued)

OTHER PUBLICATIONS

International Search Report issued in International Application No. PCT/JP2019/024218 dated Sep. 24, 2019, pp. 1-3, together with English translation.

*Primary Examiner* — Tung T Vo
(74) *Attorney, Agent, or Firm* — Carter, DeLuca & Farrell LLP

(57) ABSTRACT

The image capturing system for generating a virtual viewpoint image has a plurality of cameras installed so as to capture a predetermined position from different directions. The plurality of cameras includes at least one pair of cameras including a first camera and a second camera installed at a position of two-fold symmetry of the first camera with an axis passing the predetermined position and vertical to an image capturing field being taken as a center, or a position closest to the position of two-fold symmetry. Further, between the first camera and the second camera, a parameter that affects at least one of a texture resolution of an object in a captured image and an image capturing range (Continued)

of a camera among parameters specifying characteristics of image capturing devices is different.

19 Claims, 18 Drawing Sheets

(51) Int. Cl.
*H04N 13/243* (2018.01)
*H04N 13/111* (2018.01)

(58) Field of Classification Search
USPC .......................................................... 348/48
See application file for complete search history.

(56) References Cited

U.S. PATENT DOCUMENTS

| | | | |
|---|---|---|---|
| 2016/0205341 A1* | 7/2016 | Hollander | H04N 7/015 375/240.08 |
| 2016/0220905 A1* | 8/2016 | Harada | A63F 13/5258 |
| 2017/0289219 A1* | 10/2017 | Khalid | G06F 3/00 |
| 2018/0160049 A1* | 6/2018 | Aizawa | H04N 5/247 |
| 2020/0019041 A1* | 1/2020 | Moltaji | G06T 17/20 |
| 2020/0126290 A1 | 4/2020 | Itakura | |
| 2020/0293809 A1 | 9/2020 | Itakura | |

FOREIGN PATENT DOCUMENTS

| | | |
|---|---|---|
| JP | 2018-56971 A | 4/2018 |
| WO | 2018/088037 A1 | 5/2018 |

* cited by examiner

IMAGE CAPTURING SYSTEM, ARRANGEMENT DETERMINATION APPARATUS, ARRANGEMENT DETERMINATION METHOD, AND STORAGE MEDIUM

CROSS-REFERENCE TO RELATED APPLICATIONS

This application is a Continuation of International Patent Application No. PCT/JP2019/024218, filed Jun. 19, 2019, which claims the benefit of Japanese Patent Application No. 2018-121985, filed Jun. 27, 2018, and Japanese Patent Application No. 2018-122420, filed Jun. 27, 2018, all of which are hereby incorporated by reference herein in their entirety.

FIELD

The present disclosure relates to a system to acquire a multi-viewpoint image used at the time of generating a virtual viewpoint image and a technique to generate a virtual viewpoint image.

BACKGROUND ART

There is known a technique to generate an image (virtual viewpoint image) obtained in a case where an object is viewed from an arbitrary virtual viewpoint from an image (multi-viewpoint image) obtained by capturing the object by a plurality of cameras. Then, the quality of the virtual viewpoint image depends on the number of cameras that capture the object and the quality of the multi-viewpoint image. For example, in a match of a sport, such as soccer and rugby, objects, such as players, are dispersed in a wide image capturing space, such as a game field, and moving therein. In the image capturing scene such as this, in a case where a plurality of cameras is installed so as to face the center of the field, it is possible to generate a high-quality virtual viewpoint image for a player who is located at the center of the field. On the other hand, for a player or the like located at the end portion of the field, the cameras including the player or the like within their viewing angles are limited in number, and therefore, there is a possibility that it is not possible to obtain a multi-viewpoint image necessary for generation of a virtual viewpoint image or it is possible to obtain only a low-quality virtual viewpoint image. In a case where the viewing angles of all the cameras that are installed are set so as to include the entire field, it is possible to obtain a sufficient number of multi-viewpoint images irrespective of the position on the field of a player or the like, and therefore, it is possible to generate a predetermined-quality virtual viewpoint image. However, the size of the player or the like that is captured in each captured image in that case is small and the resolution of its texture becomes low, and therefore, the resolution of the texture of the object in the virtual viewpoint image that is obtained also becomes low.

In this regard, Patent Document 1 has described a method of generating a high-quality virtual viewpoint image by additionally providing a non-fixed zoom camera that chases a specific object and additionally using a high-resolution texture for the specific object.

CITATION LIST

Patent Literature

PTL 1 Japanese Patent Laid-Open No. 2012-185772

SUMMARY

With the technique described in Patent Document 1 described above, it is possible to improve the quality of the virtual viewpoint image only for the specific object chased by the non-fixed zoom camera. Because of this, in a case where an attempt is made to obtain a sufficient number of multi-viewpoint images by taking the scene or the like of a sport in which many objects, such as players, exist on the field as a target by applying the technique of Patent Document 1, a large number of cameras are necessary. Actually, there are restrictions on the number of cameras that can be installed in a stadium or the like in terms of the physical space, the cost and the like, and therefore, a technique is demanded that can deal with even an image capturing scene in which many objects exist with a smaller number of cameras.

Means for Solving Problem

The image capturing system according to the present disclosure includes: a plurality of image capturing devices which are arranged so as to capture a predetermined position from different directions and are used for generating a virtual viewpoint image, and the plurality of image capturing devices includes at least one pair of image capturing devices including: a first image capturing device; and a second image capturing device installed at a position of two-fold symmetry of the first image capturing device with an axis passing the predetermined position and vertical to an image capturing field being taken as a center, or a position closest to the position of two-fold symmetry and between the first image capturing device and the second image capturing device, a parameter that affects at least one of a resolution of an object in a captured image and an image capturing range of an image capturing device among parameters specifying characteristics of image capturing devices is different.

Further features of the present disclosure will become apparent from the following description of exemplary embodiments with reference to the attached drawings.

DESCRIPTION OF THE EMBODIMENTS

In the following, embodiments of the present disclosure are explained with reference to the drawings. The following embodiments are not intended to limit the present disclosure and all combinations of features explained in the present embodiments are not necessarily indispensable to the solution of the present disclosure. Explanation is given by attaching the same symbol to the same configuration.

First Embodiment

In the present embodiment, a determination method of a configuration of an image capturing system is explained, which takes into consideration suppression of a reduction in the feeling of resolution of a virtual viewpoint image resulting from that the object size in a captured image is small and a reduction in the area in which a reduction in the quality of a virtual viewpoint image occurs resulting from that the number of image capturing devices (hereinafter, called "cameras") is small. In the following, there is a case where suppression of a reduction in the feeling of resolution of a virtual viewpoint image is expressed as "improvement of image quality" and a reduction in the area in which a reduction in the quality of a virtual viewpoint image occurs is expressed as "improvement of the degree of freedom of viewpoint", respectively. The virtual viewpoint image is an image that is generated by an end user and/or an appointed operator or the like freely operating the position and orientation of a camera (virtual camera) corresponding to a virtual viewpoint and also called a free-viewpoint image, an arbitrary viewpoint image and the like. The virtual viewpoint image may be a moving image or a still image. Further, the virtual viewpoint may be set automatically. In the present embodiment, an object refers to a moving object that moves (or its absolute position may vary) in a case where image capturing is performed from the same direction in a time series. An object refers to, for example, a person or a ball in a ball game. In the present embodiment, three-dimensional shape data is data representing a three-dimensional shape of an object and represented by, for example, a point cloud having positional information on x, y, and z in a three-dimensional space in a world coordinate space uniquely indicating an image capturing-target image capturing space. Three-dimensional shape data is not limited to that represented by a point cloud and may be represented by another data format and may be represented by, for example, polygon mesh data configured by faces of a simple convex polygon, such as a triangle and a rectangle, or voxels.

Figure 1A:
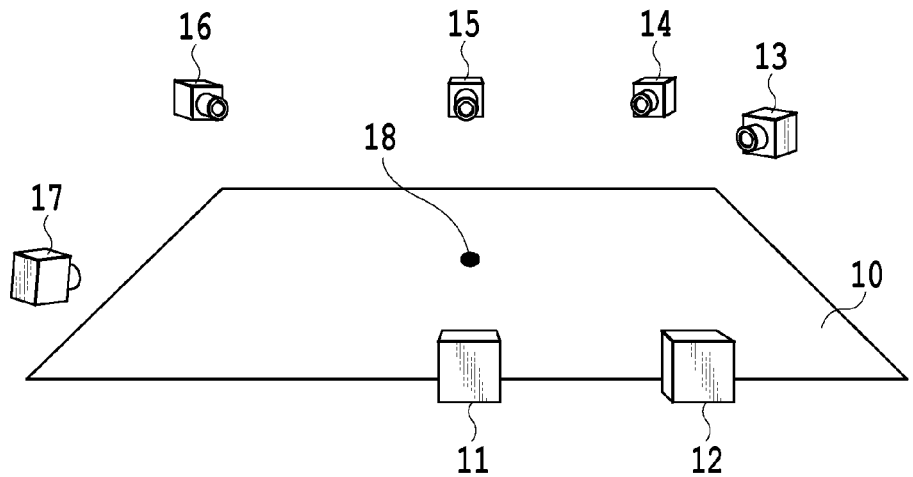
FIG. 1A and FIG. 1B are each a diagram showing an example of camera arrangement for capturing an object from different viewpoints.
Figure 1B:
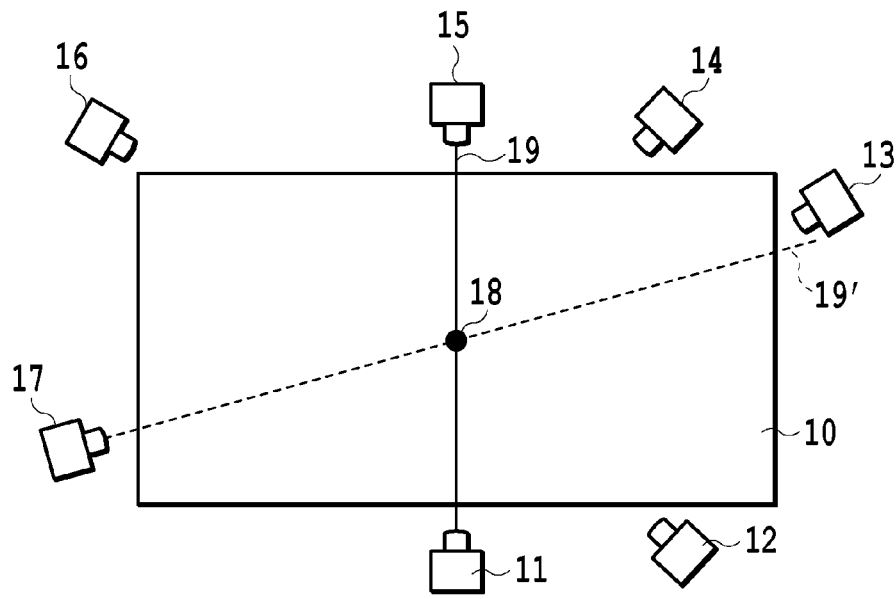

FIG. 1A and FIG. 1B are each a diagram showing an example of camera arrangement for capturing an object form different viewpoints according to the present embodiment and FIG. 1A shows a three-dimensional aerial view and FIG. 1B shows a two-dimensional plan view viewed from directly above. In this camera arrangement, seven cameras 11 to 17 perform image capturing and acquire a multi-viewpoint image for generating a virtual viewpoint image. The number of cameras, here seven, is an example and it is needless to say that more cameras are installed in a case where image capturing is performed for a wide space, such as a space for soccer and rugby. As shown in FIG. 1A and FIG. 1B, the cameras 11 to 17 are arranged so as to surround the entire circumference of the image capturing space. Further, the cameras 11 to 17 are arranged so as to face an arbitrary gaze point 18 that is set on an image capturing field (bottom of image capturing space) 10. The image capturing field 10 refers to a ground in a game, such as soccer and rugby. Here, the gaze point refers to an arbitrary point (ling-of-sight direction of camera) within the image capturing space at which the camera gazes and the cameras 11 to 17 shown in FIG. 1A and FIG. 1B face the same gaze point 18. However, the gaze point of each camera may be different slightly. Here, the gaze point 18 is located at the intersection of the optical axis of each camera and the bottom 18. The position of the gaze point is arbitrary and for example, it may also be possible to set the position of the gaze point in the midair within the image capturing space.

Figure 2A:
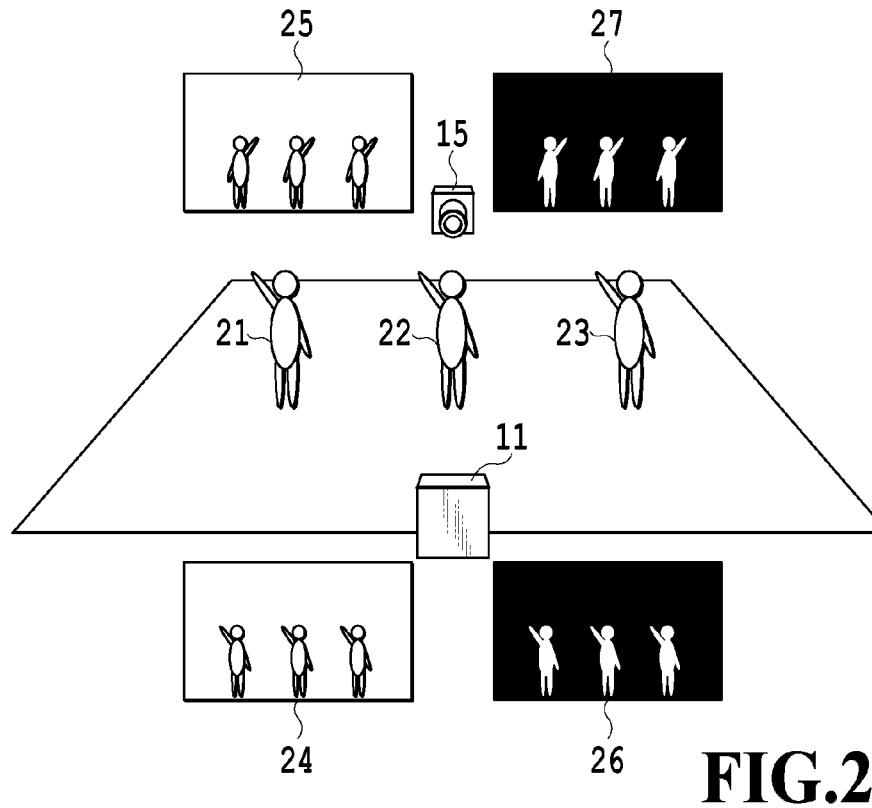
FIG. 2A is a diagram explaining a captured image obtained in a case where cameras located at positions facing each other have the same viewing angle and FIG. 2B is a diagram explaining a captured image obtained in a case where cameras located at positions facing each other have different viewing angles.

In the past, a wide viewing angle that includes almost the entire image capturing space within a visual field was set for all of the cameras 11 to 17 in order to improve the degree of freedom of viewpoint. Because of that, the resolution of the texture of an object, such as a person, in a multi-viewpoint image obtained by a plurality of cameras was low and as a result of that, it was possible to obtain only a low-image quality virtual viewpoint image that was generated. FIG. 2A is a diagram explaining a captured image that is obtained in a case where the camera 11 and the camera 15 located at the position facing the camera 11 have the same viewing angle. In a case where the viewing angle of both the cameras is the same, a captured image 24 is obtained by the camera 11 and a captured image 25 is obtained by the camera 15. In this case, the number and the kind of person objects 21 to 23 captured in both the captured images 24 and 25 are substantially the same (in the example in FIG. 2A, perfectly the same). Further, in a case where three-dimensional shape data on an object is generated by a method, such as the visual hull method, the difference between a silhouette image 26 based on the captured image 24 and a silhouette image 27 based on the captured image 25 lies only in that the left and the right are reversed and there is not a large difference in information obtained therefrom. Because of this, even in a case where the three-dimensional shape data is generated without using the captured image obtained by the camera 11 (or the camera 15), the accuracy of the three-dimensional shape data on the object to be generated is not so different from that in a case where both the captured images are used.

Figure 2B:
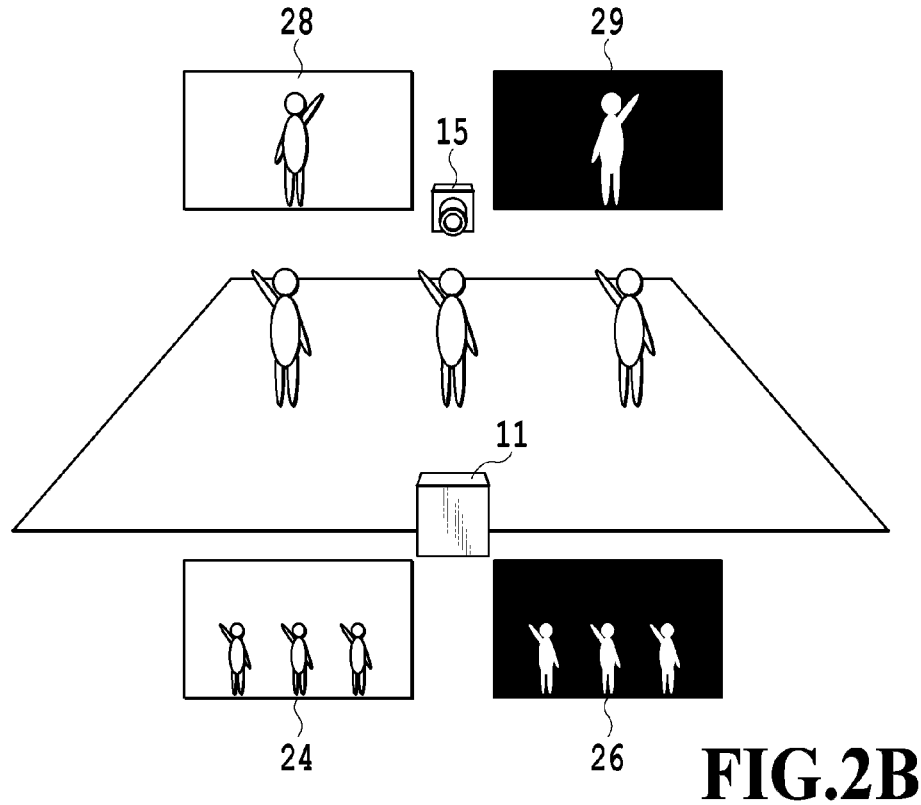

In contrast to the conventional technique described above, in the present embodiment, different viewing angles are set to the cameras installed at the positions facing each other with the gaze point being sandwiched in between, and a wide viewing angle is set to one camera and a narrow viewing angle is set to the other. Specifically, to the cameras 11, 12, 13, 14, 16, and 17, a viewing angle that includes almost the entire image capturing space including the image capturing field 10 within the visual field is set. Then, to the camera 15 located at the position facing the camera 11 on a line 19 connecting the camera 11 and the gaze point 18 (line that is used as a reference and hereinafter, called "base line"), a viewing angel narrow compared to that of the camera 11 is set. FIG. 2B is a diagram explaining the captured image that is obtained in a case where the camera 15 located at the position facing the camera 11 has a viewing angle narrower than that of the camera 11. In this case, by the camera 15, a captured image 28 in which the object is enlarged (that is, the resolution of texture is high) and a silhouette image 29 thereof are obtained. As described above, by setting different viewing angles to the cameras installed so as to face each other with the gaze point being sandwiched in between, it is possible to acquire a texture image whose resolution of the object is high without reducing the accuracy of the three-dimensional shape data on the object to be generated. As a result of that, it is made possible to generate a high-image quality virtual viewpoint image while guaranteeing the degree of freedom of viewpoint.

In the present embodiment, explanation is given by taking the case as an example where there are seven cameras that are installed, but it is only required that there be at least two cameras and one pair of cameras facing each other with a gaze point being sandwiched in between (more desirably, cameras exist at positions of two-fold symmetry with a gaze point being taken as a center axis) be included. At this time, each camera needs to face the same gaze point, but a small difference within a range in which it is possible to evaluate that each camera faces substantially the same gaze point is permitted. In a case where a quite different gaze point is set to each camera group, it is possible to apply the present embodiment for each gaze point. For example, in a case where two camera groups exist, one being in charge of the left half and the other being in charge of the right half of the soccer field, and a separate gaze point (for example, in the vicinity of the front of each goal) is set to each camera group, it is sufficient to apply the present embodiment to each camera group corresponding to each gaze point.

Further, in the present embodiment, the one pair of cameras that establishes a pair relationship is cameras located at the positions whose distances from the gaze point as a center are the same, but the distances from the gaze point do not need to be the same. Further, the cameras that are combined with each other are only required to be located at the positions substantially facing each other with the gaze point being sandwiched in between. For example, in FIG. 1B, it may also be possible to change the viewing angle of the camera 13 existing at the position slightly shifted from a base line 19' indicated by a broken line connecting the camera 17 and the gaze point 18 with the camera 17 being taken as a reference. To what extent the shift is permitted is determined by taking into consideration various conditions, such as the size of the image capturing-target space and the number of installed cameras. As described above, the one pair of cameras includes a camera and another camera installed at a position of two-fold symmetry of the camera with the axis passing the gaze point and vertical to the image capturing field being taken as a center, or a position closest to the position of two-fold symmetry among a plurality of cameras. Then, the one pair of cameras does not necessarily need to face each other with the gaze point being sandwiched in between.

Further, in the present embodiment, the viewing angle of one of the one pair of cameras in the pair relationship is made narrower than that of the other camera, but this is not limited. For example, it may also be possible to set in advance the viewing angle of the camera whose characteristic is not changed narrower than the standard and make the viewing angle of the camera whose characteristic is changed wider. Further, the viewing angle of the camera whose characteristic is not changed does not need to be the same and may be different for each camera.

Furthermore, in the present embodiment, as the parameter of the camera characteristic that affects the texture resolution of an object, the viewing angle is changed, but the change-target parameter is not limited to the viewing angle. The change-target parameter may be another parameter that affects the texture resolution of an object, for example, such as the focal length, the size of an imaging sensor, the kind of sensor, and the kind of lens. For example, by increasing the focal length or changing the lens to a telephoto-lens, the same effects in a case where the viewing angle is narrowed are obtained. Further, it may also be possible to change a camera compatible with 4K to a camera compatible with 8K and so on.

By determining the configuration of cameras that are installed so as to surround the image capturing space in accordance with the way of thinking explained above, it is possible to construct an image processing system capable of implementing improvement of both the degree of freedom of viewpoint and the image quality in generation of a virtual viewpoint image while suppressing the number of cameras.

Second Embodiment

In the first embodiment, explanation is given to the basic way of thinking for determining a camera configuration capable of implementing both improvement of the image quality of virtual viewpoint image and improvement of the degree of freedom of viewpoint while suppressing the number of cameras to be installed. Next, an image processing system is explained that determines a camera configuration in accordance with the way of thinking explained in the first embodiment and generates a virtual viewpoint image by acquiring a multi-viewpoint image in the camera configuration.

The apparatus that determines a camera configuration to be explained in the following is an apparatus that acquires camera information indicating positions and orientations of a plurality of cameras installed so as to capture a predetermined position in the image capturing space from different directions and acquires positional information on a gaze point and determines camera configuration arrangement based on those pieces of information. This apparatus determines the configuration of at least one pair of cameras including a first camera and a second camera installed at a position of twice-fold symmetry of the first camera with an axis passing a predetermined position and vertical to an image capturing field being taken as a center, or a position closest to the position of twice-fold symmetry. Specifically, by this apparatus, the camera configuration is determined so that the parameter that affects at least one of the texture resolution of an object in a captured image and the camera image capturing range is different between the first camera and the second camera configuring the one pair of cameras. Further, by this apparatus, the camera configuration is determined so that the parameter that affects the texture resolution of an object in a captured among the parameters that specify the characteristics of the two cameras is different in the one pair of cameras facing each other with a predetermined position being sandwiched in between. That is, by using this apparatus, it is made possible to determine an appropriate camera arrangement configuration by inputting camera information and positional information on a gaze point from the outside.

(System Configuration)

Figure 3:
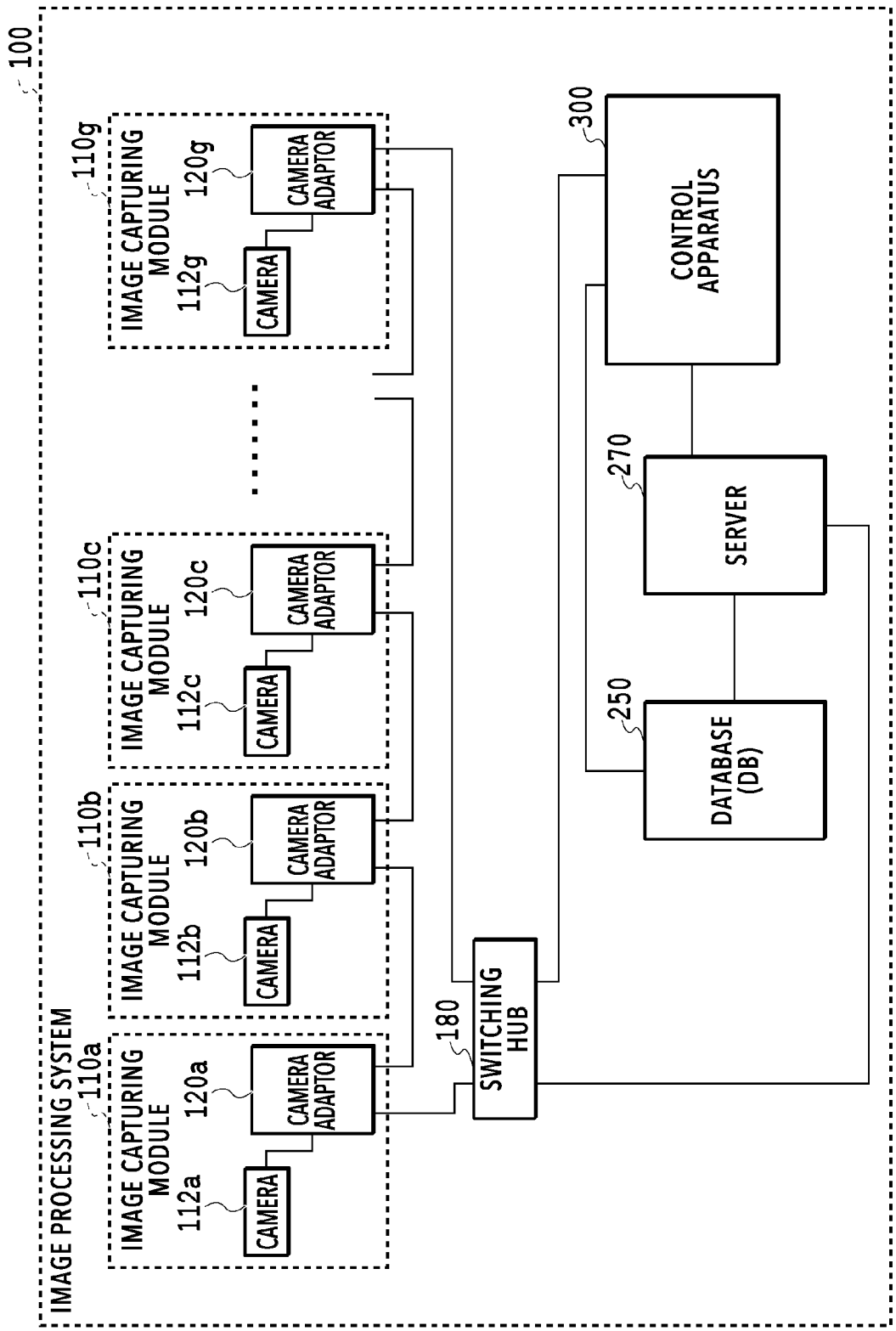
FIG. 3 is a diagram showing an example of a system configuration.

The image processing system that generates a virtual viewpoint image according to the present embodiment is explained by using a system configuration diagram in FIG. 3. An image processing system 100 has image capturing modules 110a to 110g, a database (DB) 250, a server 270, a control apparatus 300, a switching hub 180, and an end user terminal (not shown schematically). That is, the image processing system 100 has three function domains called a video image collection domain, a data save domain, and a video image generation domain. The video image collection domain includes the image capturing modules 110a to 110g, the data save domain includes the DB 250 and the server 270, and the video image generation domain includes the control apparatus 300 and the end user terminal.

The control apparatus 300 performs a variety of kinds of control, such as management of the operation state and setting of various parameters, through a network for each of the blocks configuring the image processing system 100. By this control apparatus 300, the series of processing is implemented, such as the above-described camera configuration determination, multi-viewpoint image acquisition, virtual viewpoint setting, and virtual viewpoint image generation. Details of the control apparatus 300 will be described later.

The image capturing modules 110a to 110g each have corresponding one of cameras 112a to 112g. In the following, there is a case where the systems of the seven sets of the image capturing modules 110a to 110g are not distinguished from one another and the image capturing modules 110a to 110g are simply described as "image capturing module 110". Similarly, there is a case where the device within each image capturing module 110 is also described as "camera 112" or "camera adapter 120". The number of image capturing modules 110 is set to seven, but this is merely an example, and the number is not limited to this. The image capturing modules 110a to 110g are connected in a daisy chain. By this connection form, there is an effect that it is possible to reduce the number of connection cables and save the wiring work in a case where the amount of image data increases accompanying an increase in resolution of a captured image to 4K or 8K and an increase in the frame rate. The connection form is arbitrary and for example, a star network configuration may be accepted in which the image capturing modules 110a to 110g are connected to the switching hub 180, respectively, and transmission and reception of data between the image capturing modules 110 are performed via the switching hub 180. The camera adaptor 120 performs data communication with the other camera adaptors 120, the server 270, and the control apparatus 300. Further, the camera adaptor 120 performs processing, such as foreground/background separation processing, foreground three-dimensional shape data source information generation processing, and dynamic calibration, for the data of an image captured by the camera 112 and the image data received from the other camera adaptors 120. Furthermore, the camera adaptor 120 controls the camera 112 based on the control signal from the control apparatus 300. Specifically, the camera adaptor 120 starts and stops image capturing, sets image capturing parameters (number of pixels, color depth, frame rate, and white balance), acquires state information (during image capturing, under suspension, during synchronization, error and the like) on the camera 112, changes the setting of the viewing angle and the focal length, and so on. The image captured by the camera 112a within the image capturing module 110a is transmitted to the camera adaptor 120b of the image capturing module 110b after predetermined image processing has been performed in the camera adaptor 120a. Similarly, the image capturing module 110b transmits the image captured by the camera 112b, which is combined with the image acquired from the image capturing module 110a, to the image capturing module 110c. By continuing the operation such as this, the captured images acquired by the image capturing modules 110a to 110g are transmitted from the image capturing module 110g to the switching hub 180, and then transmitted to the server 270.

The DB 250 stores the data of the multi-viewpoint image captured by each image capturing module 110 based on the instructions of the control apparatus 300 and performs transmission and reception of image data and the like with the server 270 by high-speed communication, such as Infini-Band, Further, the DB 250 stores 3D data of the facility and the structure located within the image capturing space and functions as a background 3D data library. The 3D data of the facility and the structure is prepared in advance in accordance with an image capturing scene (kind of sport, event) and transmitted to the server 270 in response to a request from the control apparatus 300.

The server 270 writes the image data acquired from the image capturing module 110g to the DB 250 in accordance with the identification number of the camera, the data type, and the frame number. Then, the server 270 receives information (virtual viewpoint information) relating to the virtual viewpoint based on the user instructions or the like from the control apparatus 300. Then, the server 270 generates a virtual viewpoint image by performing rendering processing in accordance with the received virtual viewpoint information. The rendering image (virtual viewpoint image) that represents the appearance from the virtual viewpoint obtained by the rendering processing is transmitted to the control apparatus 300 from the server 270. Then, it is possible for a user to browse the image in accordance with the virtual viewpoint specified by the user.

(Details of Control Apparatus)

Figure 4A:
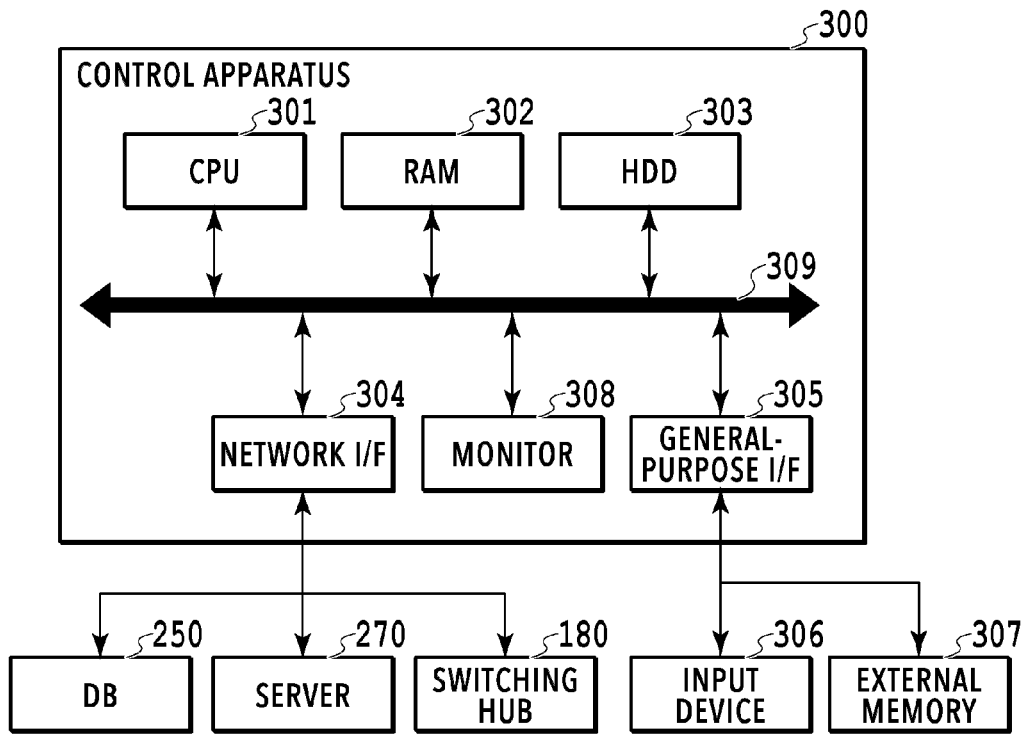
FIG. 4A is a diagram showing an example of a hardware configuration of a control apparatus and FIG. 4B is a diagram showing an example of a software configuration of the control apparatus.
Figure 4B:
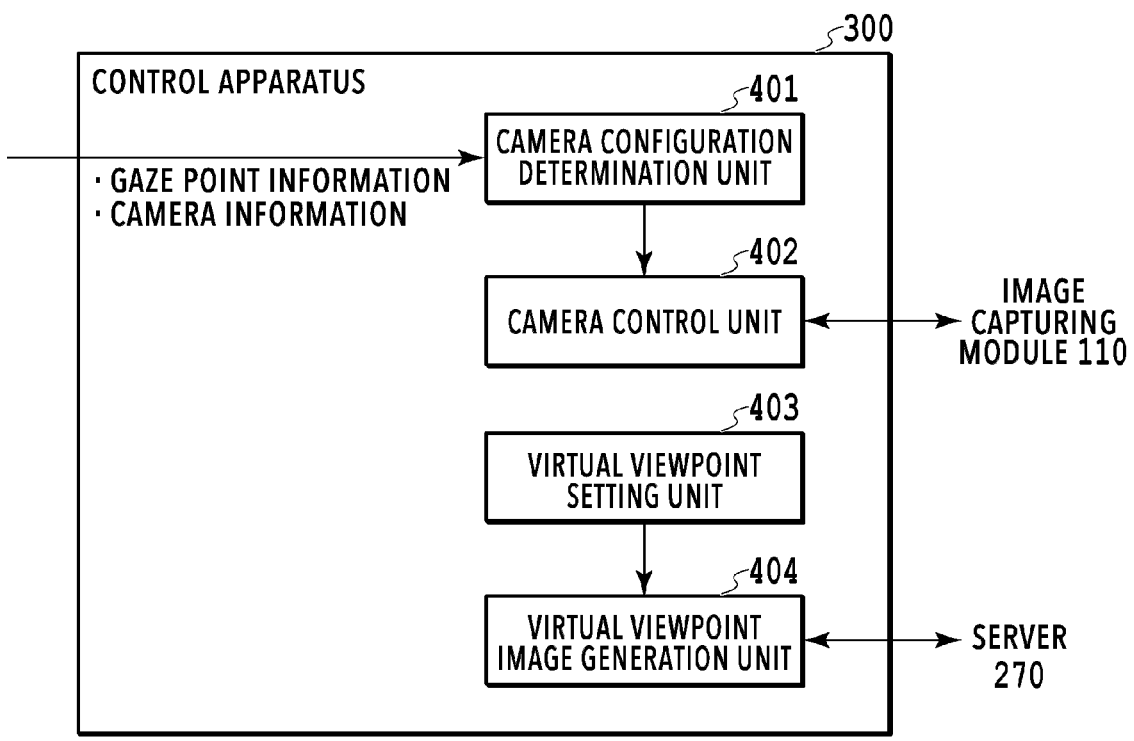

FIG. 4A is a diagram showing an example of a hardware configuration of the control apparatus 300. The control apparatus 300 comprises a CPU 301, a RAM 302, an HDD 303, a network I/F 304, a general-purpose I/F 305, a monitor 308, and a main bus 309. The network I/F 304 is an interface that connects the DB 250, the server 270, and the switching hub 180 to the main bus 309. The general-purpose I/F 305 is an interface that connects an input device 306, such as a mouse and a keyboard, and an external memory 307, such as a memory card, to the main bus 309. Then, FIG. 4B is a function block diagram showing a software configuration of the control apparatus 300 according to the present embodiment and the control apparatus 300 includes a camera configuration determination unit 401, a camera control unit 402, a virtual viewpoint setting unit 403, and a virtual viewpoint image generation unit 404. Each of these units is implemented by the CPU 301 loading a predetermined program stored in the HDD 303 onto the RAM 302 and executing the program.

(Flow of System Control)

Figure 5:
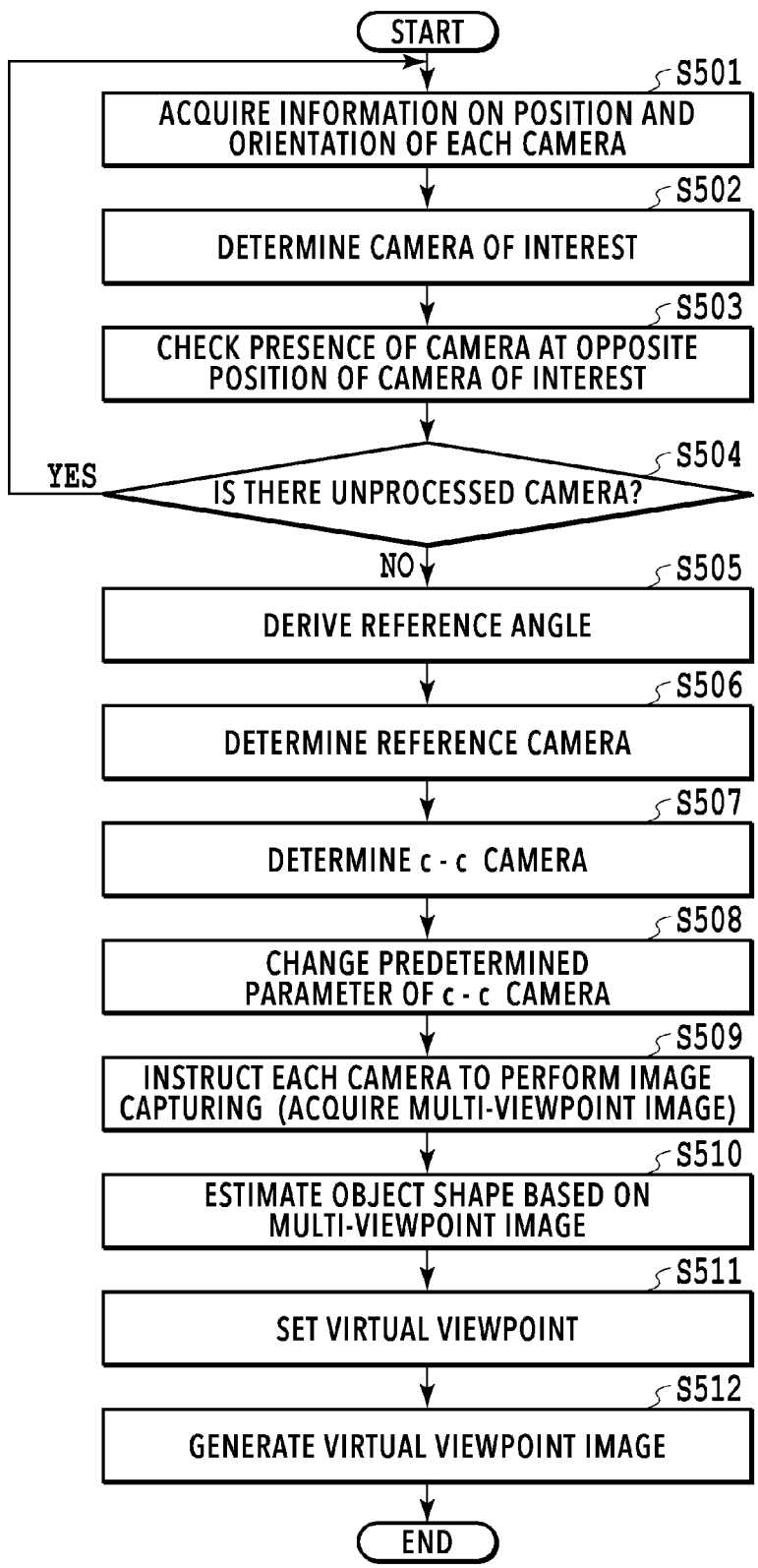
FIG. 5 is a flowchart showing a flow of control of an image processing system according to a second embodiment.

Following the above, a flow of control of the image processing system by the control apparatus 300 according to the present embodiment is explained. FIG. 5 is a flowchart showing a flow of control in the image processing system shown in FIG. 3 according to the present embodiment. In the following, details of the processing that is performed by each unit shown in FIG. 4B are explained along the flow in FIG. 5. Symbol "S" in the following explanation represents a step.

At S501, the camera configuration determination unit 401 acquires camera information indicating positions and orientations (optical axis directions) of a plurality of installed cameras. The camera information is information that represents the position of each camera by a position pi (pxi, pyi, pzi) in a coordinate space and the orientation of each camera by a vector vi [vxi, vyi, vzi] by defining three-dimensional coordinate axes whose x-axis and y-axis represent the bottom of the image capturing space and whose z-axis represents the height thereof. Here, i is the identification number of each of the plurality of installed cameras. The contents of the camera information are not limited to those described above and the camera information may be information on the coordinate position of each camera and the coordinate position of the gaze point.

Figure 6:
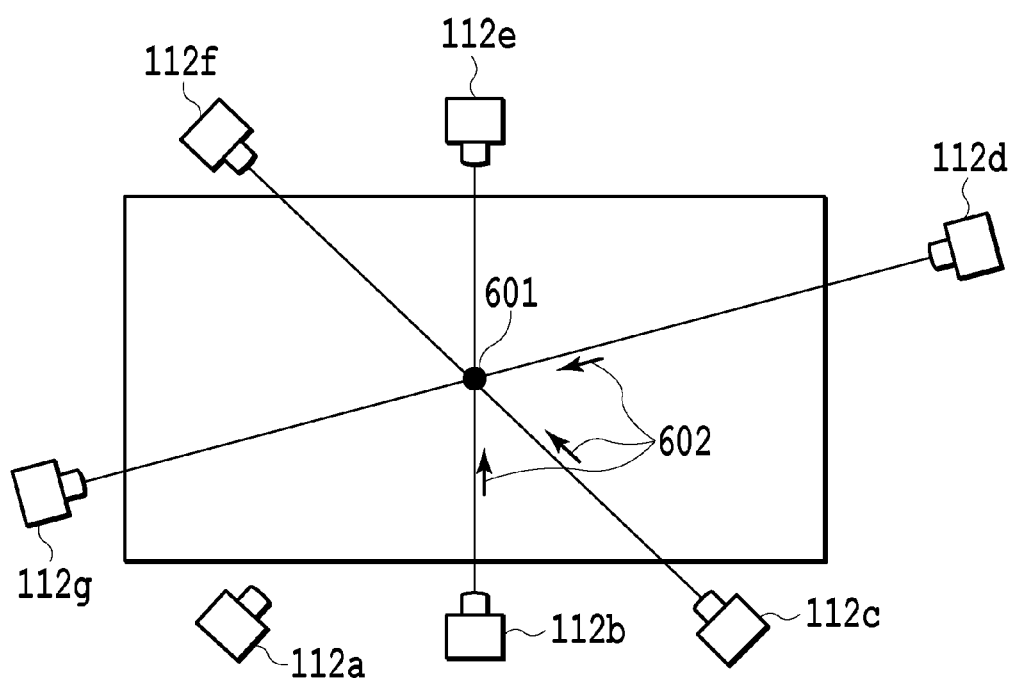
FIG. 6 is a diagram showing an example of arrangement of each camera.

FIG. 6 is a diagram showing an example of the arrangement of each camera specified by the camera information. Here, the seven cameras 112a to 112g shown in FIG. 3 are installed so as to face a gaze point 601. In this case, it is assumed that, for example, the viewing angle of the cameras 112e to 112g for each of which another camera exists at the opposite position of the own camera is narrowed compared to that of the cameras 112b to 112d located at the respective opposite positions. In this case, the resolution of the texture of an object viewed from the direction of each of the cameras 112e to 112g is high. However, the resolution of the texture viewed from an opposite direction 602 is low, and therefore, it is not possible to improve the image quality of the entire object. Consequently, at S502 to S507 that follow, the cameras capable of capturing an object with a high resolution although whose viewing angle is narrow are arranged substantially at equal intervals on the entire circumference of the image capturing space.

At S502, the camera configuration determination unit 401 refers to the camera information acquired at S501 and determines one camera on which attention is focused (camera of interest) among all the installed cameras. Normally, the camera of interest is determined in order from the camera whose number i described above that identifies the camera is the smallest. At S503 that follows, the camera configuration determination unit 401 performs processing to determine whether another camera exists at the opposite position with the gaze point being sandwiched in between by taking the camera of interest as a reference by using the camera information acquired at S501. This determination processing is performed by, for example, a procedure as in 1) to 3) below.

1) Calculate a direction vector vi [vpi, vqi] for each camera, which is obtained by projecting a vector indicating the line-of-sight direction of each camera onto a two-dimensional plane and performing normalization. Here, i is the number that identifies each camera and i=1 to 7.

2) Calculate an inner product vo·vj of a direction vector vo [vpo, vqo] of the camera of interest and a direction vector vj [vpj, vqj] of a camera other than the camera of interest. Here, o indicates the identification number of the camera of interest and j indicates the identification number of a camera other than the camera of interest. For example, in a case where i=1, o=1 and j=2 to 7.

3) Determine that, in a case where there exists a camera whose value of the inner product vo·vj calculated in 2) described above is negative and whose value obtained by reversing the sign of the inner product vo·vj is 1, another camera exist at the opposite position of the camera of interest.

The results of the determination processing thus obtained are stored as opposite camera presence/absence information in association with the camera of interest. The opposite camera presence/absence information includes, for example, a first value and a second value. The first value is one-bit information indicating a case where another camera exists at the opposite position by "1" and a case where another camera does not exist by "0". Then, the second value is information on the identification number of the other camera in a case where the first value is "1" (in a case where another camera exists at the opposite position). Consequently, in a case where the first value is "0", the second value is blank (0). It is assumed that at the point in time of the start of this processing, the opposite camera presence/absence information on each camera is initialized and the state is such that the first value is "0" and the second value is blank. Here, by using the two-dimensional plane and the inner product, whether or not a camera in an opposite positional relationship exists is determined, but the determination method is not limited to this. Any method may be accepted as long as it is possible to determine the presence/absence of another camera that faces the camera of interest. In a case where the results of the determination processing indicate that another camera exists at the opposite position of the own camera, the first value is updated to "1" and the second value is updated to the identification number of the other camera, respectively. Hereinafter, a camera whose first value in the opposite camera presence/absence information is "1" is called "paired camera".

At S504, whether or not the determination processing at S503 is completed for all the cameras having the same gaze point relating to the camera information acquired at S501 is determined. In a case where there is an unprocessed camera, the processing returns to S502, and the next camera is set as the camera of interest and the processing is continued. On the other hand, in a case where the determination processing is completed for all the cameras, the processing advances to S505.

At S505, the camera configuration determination unit 401 derives an angle (reference angle) that is a reference at the time of determining a camera whose characteristic is changed by using the opposite camera presence/absence information on each camera. The reference angle in a case where there is not a limit in particular to the direction in which virtual viewpoint setting is possible is a value obtained by dividing 360 degrees by the number that is half the total number of the first values in the opposite camera presence/absence information. In a case of the example in FIG. 6 described above, the first value is "1" in the opposite camera presence/absence information associated with the six cameras (112b, 112c, 112d, 112e, 112f, and 112g), and therefore, 360÷(6÷2))=120 degrees are the reference angle. That is, in a case of the camera arrangement in FIG. 6, it is determined at this step that the cameras capable of capturing an object with a high resolution although whose viewing angle is narrow are arranged on the entire circumference of the image capturing space at equal angles of 120 degrees.

At S506, the camera configuration determination unit 401 determines the camera that is the reference at the time of determining the camera whose characteristic is changed from the paired cameras whose first value in the opposite camera presence/absence information is "1" among all the installed cameras 112a to 112g. Here, one camera selected randomly from the paired cameras is taken to be the camera used as the reference (hereinafter, called "reference camera"). The determination of the reference camera is not limited to this and for example, it may also be possible to determine the camera whose interval between the paired cameras is the narrowest to be the reference camera.

At S507, the camera configuration determination unit 401 determines the camera whose characteristic is changed (hereinafter called "c-c camera") based on the camera information acquired at S501, the reference angle derived at S505, and the reference camera determined at S506. This determination processing is performed by, for example, a procedure as in 1) to 3) below.

1) Calculate an angle θbk formed by a reference camera b and a paired camera k to which the reference camera is adjacent clockwise. It is possible to find the angle θbk by, for example, the inner product of the direction vectors of the cameras. Here, k indicates the identification number of the adjacent paired camera.

2) Compare the calculated angle θbk and the reference angle. Determine, in a case where the results of the comparison indicate that the angle θbk is larger than or equal to the reference angle, the paired camera k adjacent to the reference camera to be the c-c camera and replace the paired camera k with the reference camera. On the other hand, determine, in a case where the angle θbk is less than the reference angle, the paired camera k to be not the c-c camera.

3) Perform the processing in 1) and 2) described above in the clockwise order until one of the cameras is determined to be the c-c camera in all the combinations of the paired cameras. In this manner, for all the paired cameras including the reference camera, the determination of whether or not to take the camera as the c-c camera is performed.

Here, by taking the case in FIG. 6 as an example, how the c-c camera is determined by each piece of processing at S502 to S507 is explained. First, by referring to the camera information on the seven cameras 112a to 112g, whether or not a combination of the cameras located at positions facing each other with the gaze point 601 being sandwiched in between exists is determined. As a result of the determination, the cameras belonging to each of the combinations of the cameras 112b and 112e, the cameras 112c and 112f, and the cameras 112d and 112g are determined to be the "paired cameras". Next, the reference camera is selected randomly from among the paired cameras and for example, it is assumed that the camera 112d is determined to be the reference camera. Here, the angle formed by reference camera 112d and the paired camera 112c to which the reference camera 112d is adjacent clockwise is less than the reference angle of 120 degrees, and therefore, the paired camera 112c is determined not to be the c-c camera. Further, the angle formed by the reference camera 112 and the paired camera 112b to which the reference camera 112d is adjacent clockwise but one is larger than or equal to the reference angle of 120 degrees, and therefore, the paired camera 112b is determined to be the c-c camera and the camera 112b becomes a new reference camera. The angle formed by the new reference camera 112b and the paired camera 112g to which the reference camera 112b is adjacent is less than the reference angle and the angle formed by the reference camera 112b and the paired camera 112f to which the reference camera 112b is adjacent but one is larger than or equal to the reference angle, and therefore, the camera 112f is determined to be the c-c camera. As a result of repeating this processing until one of the cameras is determined to be the c-c camera in all the combinations of the paired cameras (the cameras 112b and 112e, the cameras 112c and 112f, the cameras 112d and 112g), the camera 112b, the camera 112d, and the camera 112f are determined to be the c-c cameras in the respective combinations. In a case where the range in which virtual viewpoint setting is possible is limited, it is sufficient to set the value of the dividend to the angle of the limited range (for example, 180 degrees) in place of 360 degrees in deriving the reference angle at S505. In this case, the reference camera that is determined at S507 is selected from among the cameras located within the limited range. The information on the identification number of the camera 112 determined to be the c-c camera in this manner is sent to the camera control unit 402. Explanation is returned to the flow in FIG. 5.

At S508, the camera control unit 402 transmits a control signal for changing the parameter specifying the characteristic of the camera 112 determined to be the c-c camera to the image capturing module 110 having this camera 112. The parameter in the present embodiment is the viewing angle, and therefore, a control signal that gives instructions to change the viewing angle to a narrower one is transmitted. The camera adaptor 120 within the image capturing module 110 having received the control signal performs the setting to change the viewing angle of the camera 112 to a narrower one. In this manner, the c-c camera comes to have a viewing angle narrower than the viewing angle of the camera existing at the opposite position thereof. Due to this, the object in an image to be captured by this camera is captured larger (that is, captured image whose texture resolution of the object is higher is obtained). At this time, to what extent the viewing angle is changed may follow user instructions via the user interface, or the viewing angle may be changed to a specified value determined in advance. Further, as described in the first embodiment, the change-target parameter is not limited to the viewing angle.

At S509, the camera control unit 402 transmits a control signal to given instructions to start image capturing to the image capturing modules 110a to 110g. Due to this, in each image capturing module 110, image capturing is started and a captured image by each camera 112 is obtained. In this manner, data of a multi-viewpoint image obtained by capturing an object from different viewpoints is acquired and saved in the DB 250. In a case where the captured image is a moving image, each piece of processing that follows is performed for each frame.

At S510, the virtual viewpoint image generation unit 404 instructs the server 270 to create three-dimensional shape data (shape estimation) of each object included in the multi-viewpoint image acquired at S509. Upon receipt of the instructions, the server 270 cuts out the object area from each captured image and estimates the three-dimensional shape of each object. For the estimation of a three-dimensional shape based on the multi-viewpoint image, it may be possible to use a publicly known method, for example, such as the visual hull method and the stereo matching method.

At S511, the virtual viewpoint setting unit 403 sets a virtual viewpoint representing the three-dimensional position and orientation (optical axis direction) of the virtual camera. At this time, it may also be possible to set the viewing angle and the resolution in the virtual viewpoint image to be generated at the same time. The setting is performed based on the user instructions that are input via a UI screen (not shown schematically) for virtual viewpoint setting, which is displayed on the monitor 308. Alternatively, it may also be possible to automatically perform the setting by reading the information on the virtual viewpoint determined in advance from the HDD 303 or the like.

At S512, the virtual viewpoint image generation unit 404 instructs the server 270 to generate a virtual viewpoint image in accordance with the virtual viewpoint that is set at S511. Upon receipt of the instructions, the server 270 generates a virtual viewpoint image by a method, such as publicly known viewpoint-dependent rendering, by using the multi-viewpoint image acquired at S509 and the three-dimensional shape data created at S510. The generated virtual viewpoint image is output to the monitor 308 and it is possible for a user to browse the virtual viewpoint image from an arbitrary viewpoint that is set by the user him/herself.

The above is the flow of the system control according to the present embodiment. In the flow in FIG. 5, the reference camera is selected from among the paired cameras and the c-c camera is determined, but this is not limited. For example, it may also be possible to select the reference camera from among the cameras other than the paired cameras and determine the camera whose characteristic is not changed by a method similar to the above-described method, and determine the paired cameras that are left finally to be the c-c cameras. Further, in the flow in FIG. 5, the determination is performed clockwise, but the determination may be performed counterclockwise. Furthermore, in the flow in FIG. 5, the reference angle is found by calculation, but it may also be possible to arrange the c-c cameras evenly in accordance with the angle determined in advance.

Modification Example

In the present embodiment, the series of processes, such as the camera configuration determination, multi-viewpoint image acquisition, virtual viewpoint setting, and virtual viewpoint image generation, is controlled by the control apparatus 300, but this is not limited. For example, a configuration may be accepted in which the processing up to the installation and adjustment of the cameras is performed in advance by performing each piece of processing up to step S508 at which the camera configuration is determined by a separate independent information processing apparatus (PC) and the control apparatus 300 performs only the processing at S509 and subsequent steps.

Further, in the present embodiment, only in a case where another camera exists at the position in a completely symmetrical relationship with respect to the camera of interest, the camera of interest is determined to be the paired camera, but this is not limited. That is, in a case where there is another camera that can be evaluated to be substantially in a positional relationship of symmetry viewed from the own camera, the camera of interest can be taken as the paired camera. In that case, on the condition that there exists another camera whose value obtained by reversing the sign of the inner product vo·vj is larger than a threshold value determined in advance, the camera of interest is taken to be the paired camera. Here, the completely symmetrical relationship refers to a relationship in which two cameras are located at positions of two-fold symmetry with the axis passing the gaze point and vertical to the image capturing field being taken as a center.

Further, in the present embodiment, whether or not a camera is a paired camera is determined based on a two-dimensional direction vector, but the determination is not limited to this. For example, it may also be possible to perform determination based on a three-dimensional positional relationship including a height direction and determine that a camera is not a paired camera in a case where the height is different. For example, in a case where the installation floors are different, such as the first floor and the second floor in a stadium, the camera on the first floor and the camera on the second may be determined to be paired cameras based on a two-dimensional direction vector, but the heights are considerably different, and therefore, the cameras are not determined to be paired cameras.

Further, in the present embodiment, the reference camera is determined only once, but this is not limited. It may also be possible to adopt a camera configuration in which the arrangement of the c-c cameras becomes the most even within the range in which virtual viewpoint setting is possible by determining in order the camera whose first value in the opposite camera presence/absence information is "1" to be the reference camera and repeatedly performing the processing up to S508.

Third Embodiment

In the second embodiment, among all the installed cameras, all the cameras for which there exists another camera at the opposite position with the common gaze point being sandwiched in between are taken to be candidates of the c-c cameras and one of the cameras in the pair relationship is determined to be the c-c camera. Next, an aspect is explained as a third embodiment in which among a plurality of installed cameras, only the cameras corresponding to a predetermined number are determined to be the c-c cameras. This aspect is effective in a case where there are cameras substantially facing each other with a common gaze point being sandwiched in between among the plurality of installed cameras, but both the cameras are not located at completely symmetrical positions. Explanation of the contents in common to those of the second embodiment is omitted or simplified and in the following, different points are explained mainly.

In the present embodiment, the c-c camera is determined based on a symmetry degree of paired cameras and a proximity degree of base lines. The reason is explained first.

In a case where the base line extending from each camera does not evenly exist on the entire circumference of the image capturing space and there is a large interval between cameras, it is not possible to obtain a sufficient number of silhouette images compared to a system in which the interval such as this does not exist. In this case, the accuracy of the three-dimensional shape data on an object within an image capturing scene is reduced, and therefore, the virtual viewpoint image that is generated will be of low image quality. Consequently, it is desirable for the interval between each camera to be installed be as dense as possible and as even as possible. Further, as described previously, two silhouette images based on captured images of cameras at positions facing each other with a gaze point being sandwiched in between differ only in that the left and the right are reversed. Consequently, there is not a large difference in information obtained from the silhouette image of each captured image between the system that includes the camera arrangement so that the cameras faces each other with a gaze point being sandwiched in between and the system that does not, and therefore, a large difference does not arise in the image quality of the virtual viewpoint image that is generated.

Figure 7A:
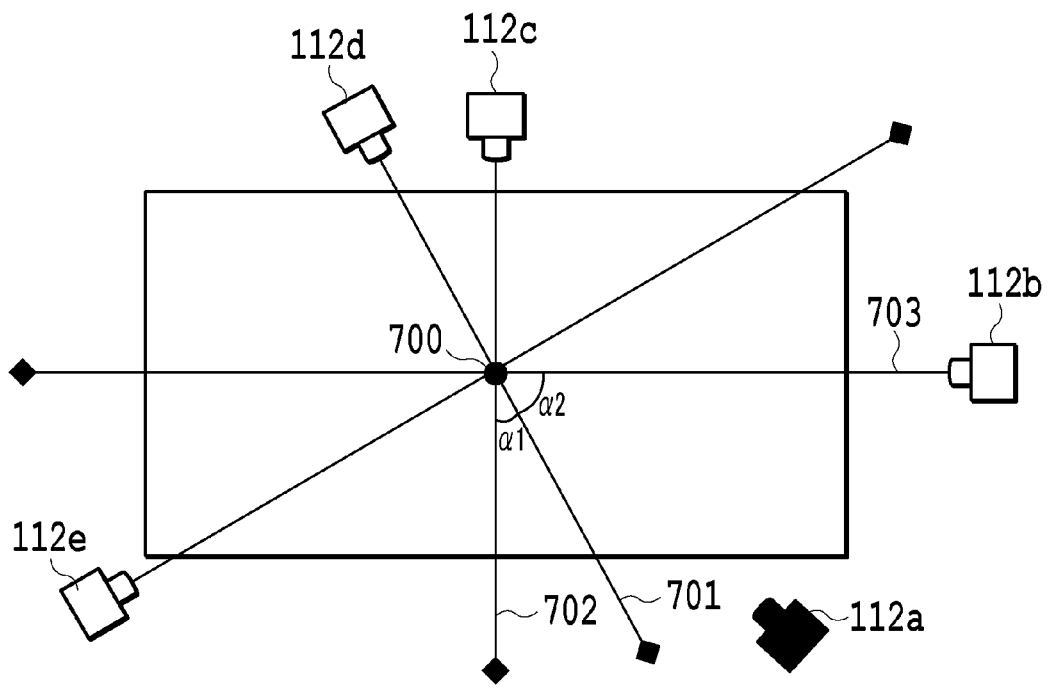
FIG. 7A and FIG. 7B are each a diagram showing an example of camera arrangement for explaining an outline of a third embodiment.
Figure 7B:
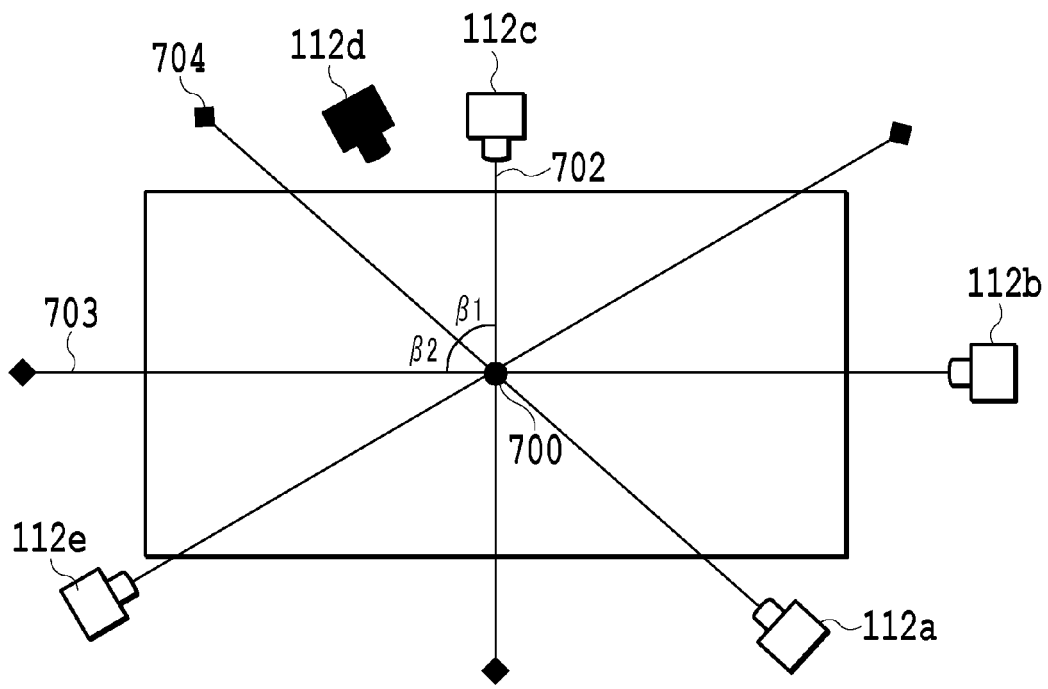

By integrating these facts, it is considered that the image quality of the virtual viewpoint image that is generated is not reduced so much even in a case where the camera, for which there exists another camera at the opposite position of the own camera and in the vicinity of the own camera, there exists another camera, is excluded from the camera group configuring the system. Consequently, in the present embodiment, the camera whose opposite camera symmetry degree is high and whose base line proximity degree is high is determined to be the c-c camera An outline of the present embodiment is explained with reference to FIG. 7A and FIG. 7B. FIG. 7A and FIG. 7B are each a diagram showing an example of the camera arrangement according to the present embodiment and in each, the five cameras 112a to 112e are installed so as to surround the image capturing space. A case is supposed where the characteristic of one camera is changed in the camera arrangement such as this.

FIG. 7A shows a case where the camera 112a is selected as the c-c camera and FIG. 7B shows a case where the camera 112d is selected as the c-c camera, respectively. In FIG. 7A, a base line 701 extending from the camera 112a is adjacent to a base line 702 extending from the camera 112c and a base line 703 extending from the camera 112b on the other side with a gaze point 700 being sandwiched in between and the base line 702 is located at the position that is obviously closer to the base line 701 compared to the position of the base line 703. That is, an angle α1 formed by the base line 701 and the base line 702 is considerably smaller than an angle α2 formed by the base line 701 and the base line 703. In contrast to this, in FIG. 7B, a base line 704 extending from the camera 112a is adjacent to the base line 702 extending from the camera 112c and the base line 703 extending from the camera 112b and located at the position substantially in the middle between the base line 702 and the base line 703. That is, an angle β1 formed by the base line 704 and the base line 702 and an angle β2 formed by the base line 704 and the base line 703 are not so different.

In a case where three-dimensional shape data on an object is generated by a method, such as the visual hull method, in order to improve the accuracy of the data, it is necessary to capture the object from every direction and acquire the silhouette image of the object. In a case where the characteristic of the camera 112a is changed in the situation in FIG. 7A, it becomes difficult to acquire a silhouette image in the area between the base line 701 and the base line 703 and as a result of that, the accuracy of the three-dimensional shape data is reduced. Then, the image quality of the virtual viewpoint image generated based on the three-dimensional shape data such as this is also reduced. In contrast to this, in FIG. 7B, the intervals between the base lines are substantially equal, and therefore, it is possible to acquire a silhouette image from different directions without unevenness. Because of this, even in a case where the characteristic of the camera 112d is changed, the image quality of the virtual viewpoint image does not deteriorate largely compared to a case where the characteristic is not changed. Consequently, the camera at the position that less affects the acquisition of a silhouette image is determined to be the c-c camera as shown in FIG. 7B. Because of this, the proximity degree of base lines on the other side with the gaze point being sandwiched in between is used as a new determination index. Here, explanation is given by taking the case as an example where there are a total of five installed cameras and one of them is taken as the c-c camera, but it is needless to say that the number of cameras to be installed and the number of cameras whose characteristic is changed are arbitrary.

(Flow of System Control)

Figure 8:
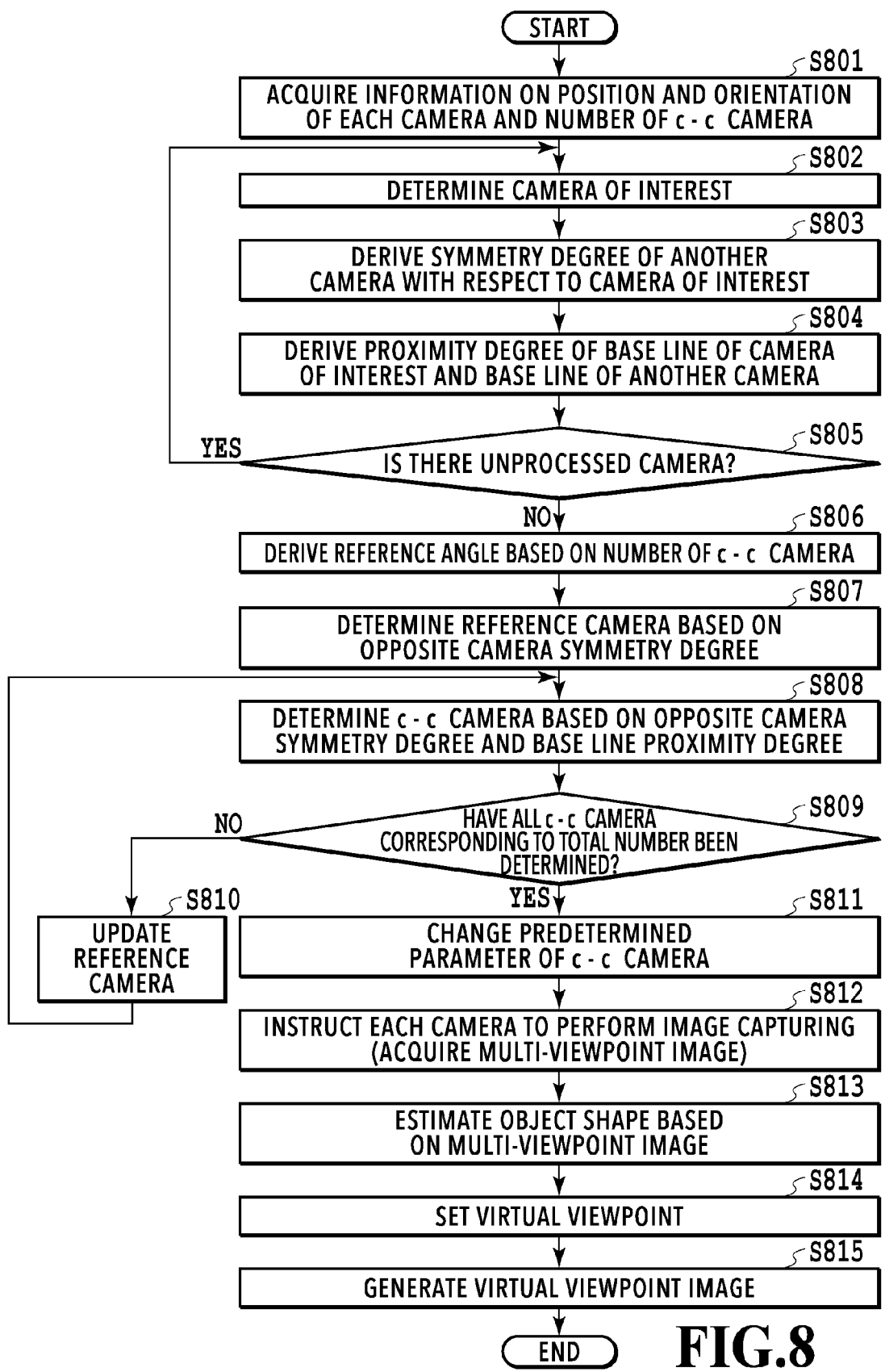
FIG. 8 is a flowchart showing a flow of control of an image processing system according to the third embodiment.

Following the above, a flow of control of an image processing system according to the present embodiment is explained along a flowchart in FIG. 8. The flow in FIG. 8 corresponds to the flow in FIG. 5 of the second embodiment and the hardware configuration and the software configuration of the control apparatus 300 are the same as those explained in the second embodiment (see FIG. 4A and FIG. 4B).

At S801, in addition to the camera information indicating the positions and orientations (optical axis directions) of the plurality of installed cameras, information on the number of cameras whose characteristic is changed among all the installed cameras is acquired. At S802 that follows, as at S502 of the flow in FIG. 5, by referring to the camera information acquired at S801, one camera of interest is determined among all the installed cameras.

At S803, the camera configuration determination unit 401 derives a symmetry degree of the camera of interest determined at S802 and a camera located at the most opposite position among the cameras other than the camera of interest by using the camera information acquired at S801. This derivation processing is performed by, for example, a procedure as in 1) to 3) below.

1) Calculate the direction vector vi [vpi, vqi] for each camera, which is obtained by projecting a vector indicating the line-of-sight direction of each camera onto a two-dimensional plane and performing normalization. Here, i is the identification number of each camera and i=1 to 5.

2) Calculate the inner product vo·vj of the direction vector vo [vpo, vqo] of the camera of interest and the direction vector vj [vpj, vqj] of a camera other than the camera of interest. Here, o indicates the identification number of the camera of interest and j indicates the identification number of a camera other than the camera of interest. For example, in a case where i=1, o=1 and j=2 to 5.

3) Find a camera whose value of the inner product vo·vj calculated in 2) described above is negative and whose value obtained by reversing the sign of the inner product vo·vj is the maximum and take the value obtained by reversing the sign of vo·vj of the camera as an index indicating the symmetry degree of the opposite camera with respect to the camera of interest.

The index value thus found is stored in association with the camera of interest as opposite camera symmetry degree information. The closer the position of another camera facing the own camera with a gaze point being sandwiched in between is to the symmetrical position, the larger the index value is (index value takes the maximum value for the completely symmetrical position) and a higher symmetry degree is indicated.

At S804, the camera configuration determination unit 401 derives how close the base line extending from another camera that is adjacent on the other side with a gaze point being sandwiched in between is to the base line extending from the camera of interest determined at S802 by using the camera information acquired at S801. This derivation processing is performed by, for example, a procedure as in 1) to 4) below.

1) Calculate the direction vector vi [vpi, vqi] for each camera, which is obtained by projecting a vector indicating the line-of-sight direction of each camera onto a two-dimensional plane and performing normalization. Here also, i is the identification number of each camera and i=1 to 5.

2) Calculate an opposite direction vector vo' [v'po, v'qo] in a case where the camera of interest is viewed from the symmetrical position with a gaze point being sandwiched in between based on the direction vector of the camera of interest. Here, o is the identification number of the camera of interest.

3) Calculate an inner product vo'·vi of the opposite direction vector and the direction vector of a camera other than the camera of interest and a cross product vo'×vj of the opposite direction vector and the direction vector of the camera other than the camera of interest for each camera.

4) Compare the value in the positive direction that makes the inner product vo'·vj the maximum in the camera whose value of the cross product vo'×vj is positive, and the value in the negative direction that makes the inner product vo'·vj the maximum in the camera whose value of the cross product vo'×vj is negative. Then, take the smaller value as the index indicating the proximity degree of the base line with respect to the camera of interest. The index value thus found is stored in association with the camera of interest as base line proximity degree information. The narrower the interval between the base line extending from the own camera, the base line being taken as a reference, and the adjacent base line, the smaller the index value indicating the base line proximity degree is, and a higher proximity degree is indicated.

At S805, whether or not the derivation processing at S803 and S804 is completed for all the cameras (all installed cameras) relating to the camera information acquired at S801 is determined. In a case where there is an unprocessed camera, the processing returns to S802, and the next camera is set as the camera of interest and the processing is continued. On the other hand, in a case where the two kinds of derivation processing are completed for all the cameras, the processing advances to S806.

At S806, the camera configuration determination unit 401 derives a reference angle at the time of determining a c-c camera by using the information on the number of c-c cameras acquired at S801. The reference angle in a case where there is not a limit in particular to the direction in which virtual viewpoint setting is possible is a value obtained by dividing 360 degrees by the number of c-c cameras. In a case of the example in FIG. 7 described above, the number of c-c cameras is one, and therefore, the reference angle is 360÷1=360 degrees.

At S807, the camera configuration determination unit 401 determines the reference camera at the time of determining a c-c camera among all the installed cameras (here, cameras 112a to 112e). Specifically, the camera configuration determination unit 401 determines the camera whose symmetry degree is the highest to be the reference camera by referring to the opposite camera symmetry degree information on each camera derived at S803. In a case where there is a plurality of cameras having the highest symmetry degree, it is sufficient to randomly determine one among them.

At S808, the camera configuration determination unit 401 determines a c-c camera based on the opposite camera symmetry degree information derived at S803 and the base line proximity degree information derived at S804. This determination processing is performed by, for example, a procedure as in 1) to 3) below.

1) Settle the position of the reference camera and detect two cameras existing in the vicinity of the position the reference angle distant clockwise from the reference camera. The reference camera at this time is the reference camera determined at S807 in the first loop and the reference camera updated at S810 in the second and subsequent loops. Further, under a predetermined condition, such as a case where the reference angle is 360 degree as in the example in FIG. 7 described above, the reference camera itself is included in the two detection-target cameras. This predetermined condition is determined by the number of installed cameras, the interval between cameras, the reference angle and the like.

2) Find an evaluation value for determining which camera to be the c-c camera by using formula (1) below for the two cameras detected in 1), respectively.

evaluation value=opposite camera symmetry degree×
(1/base line proximity degree)  formula (1)

3) Compare the evaluation values of the two cameras, which are found in 2) described above, and determine the camera whose evaluation value is larger to be the c-c camera (determine the camera whose evaluation value is smaller to be the camera whose characteristic is not changed). In this manner, one c-c camera corresponding to the reference camera is determined.

At S809, whether or not the c-c cameras corresponding to the number of cameras acquired at S801 are determined is determined. In case where there is a c-c camera that is not determined yet, the processing advances to S810. On the other hand, in a case where the c-c cameras corresponding to the total number of cameras are determined, the processing advances to S811.

At S810, the reference camera is updated. Specifically, the camera whose evaluation value is determined to be larger at S808 (camera determined to be c-c camera) is set as a new reference camera. On completion of updating, the processing returns to S808, and processing to determine the next c-c camera based on the new updated reference camera is continued.

S811 to S815 correspond to S508 to S512 of the flow in FIG. 5 respectively and there is no difference in particular, and therefore, explanation is omitted.

The above is the flow of the control of the image processing system according to the present embodiment. Due to this, it is possible to construct a system including a camera group in which the characteristics of the cameras corresponding to the number of cameras specified by a user are changed.

Modification Example

In the present embodiment, the opposite camera symmetry degree and the base line proximity degree are derived once for each camera, but this is not limited. It may also be possible to determine the next c-c camera after deriving the opposite camera symmetry degree and the base line proximity degree again for the remaining cameras excluding the determined camera each time the c-c camera is determined.

Further, at the time of determining the c-c camera, the two cameras in the vicinity of the position the reference angle distant from the reference camera are compared, but it may also be possible to determine the c-c camera by comparing three or more cameras located in the vicinity of the position.

According to the present embodiment, even in a case where there is not a combination of cameras that are in the completely symmetrical relationship in the installed cameras, it is possible to construct a system capable of implementing the improvement of both the degree of freedom of viewpoint and the image quality in generation of a virtual viewpoint image.

Fourth Embodiment

Figure 9A:
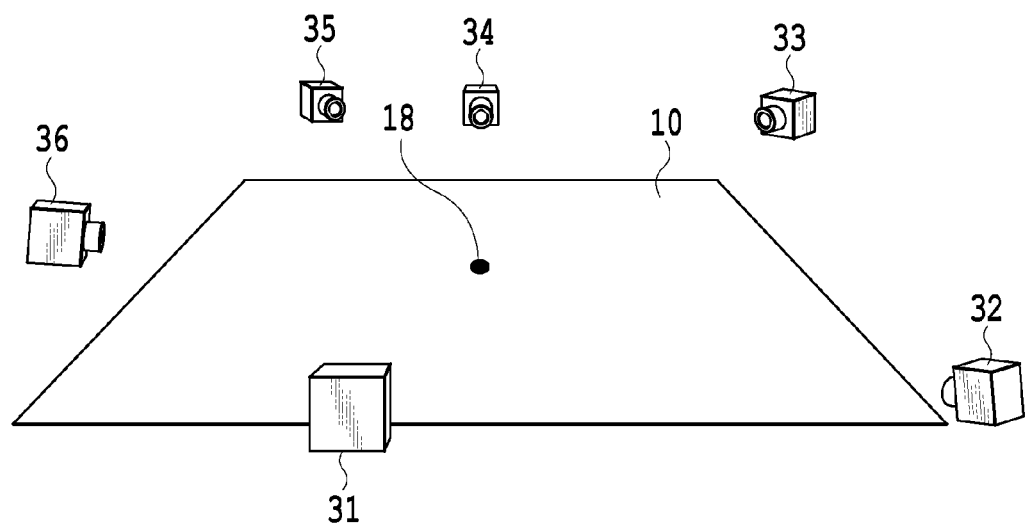
FIG. 9A and FIG. 9B are diagrams showing a configuration example of an image capturing system according to a fourth embodiment.
Figure 9B:
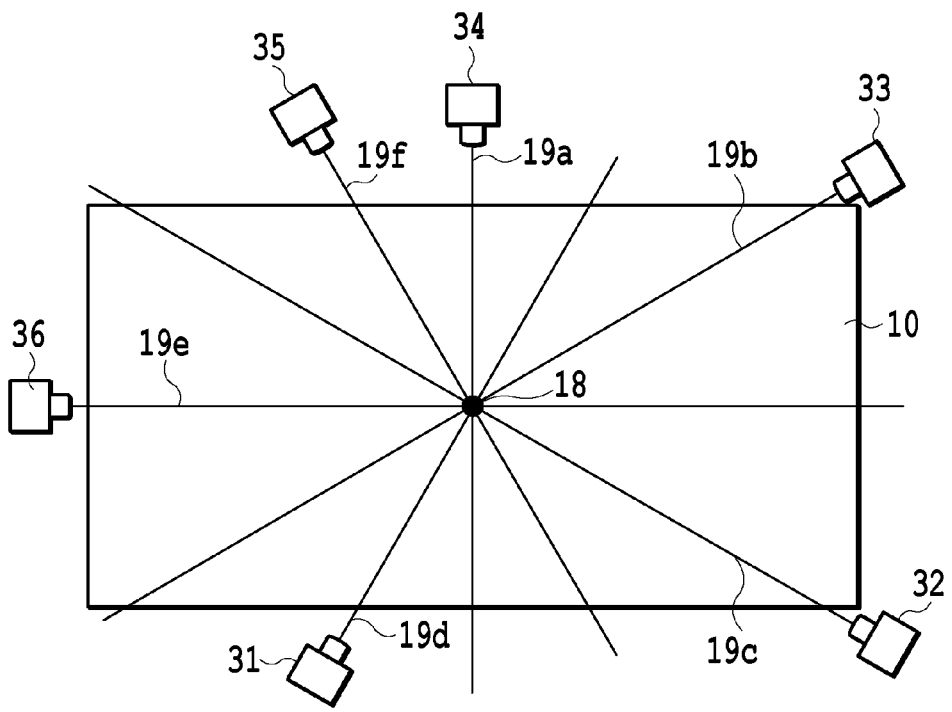

An image capturing system according to the present embodiment is explained by using FIG. 9A and FIG. 9B.

FIG. 9A and FIG. 9B are each a diagram showing an example of camera arrangement for capturing an object from different directions according to the present embodiment and FIG. 9A shows a three-dimensional aerial view and FIG. 9B shows a two-dimensional plan view viewed from directly above. With this camera arrangement, image capturing is performed by six cameras 31 to 36 and a multi-viewpoint image for generating a virtual viewpoint image is acquired.

As shown in FIG. 9A and FIG. 9B, the cameras 31 to 36 are arranged so as to capture the gaze point 18 that is set on the image capturing field 10, which is the bottom of the image capturing space.

In the image capturing system of the present embodiment, the cameras 31 to 36 are each arranged at a position other than the position of two-fold symmetry with respect to the axis including the gaze point 18 and vertical to the image capturing field 10. That is, the camera 31 to 36 are each arranged so that another camera is not arranged at the position of two-fold symmetry with respect to the axis including the gaze point 18 and vertical to the image capturing field 10.

Specific explanation is given by using FIG. 9B. For example, at the position of two-fold symmetry of the camera 34 with respect to the axis passing the gaze point 18 and vertical to the image capturing field 10, another camera is not arranged. As a matter of course, on a line segment 19a connecting the camera 34 and the gaze point 18 and its extension, a camera different from the camera 34 is not arranged. At the position closest to the line segment 19a and its extension, the camera 31 among the cameras 31 to 33 is arranged, but it is not arranged on the line segment 19a and its extension. Similarly, as regards the other cameras, at the position of two-fold symmetry with respect to the axis including the gaze point 18 and vertical to the image capturing field 10, another camera is not arranged. Further, on each of the line segment 19a and line segments 19b to 19f connecting the camera and the gaze point 18 and their extensions, only the own camera is arranged and another camera is not arranged. In the following, the position of two-fold symmetry of the camera with respect to the axis passing the gaze point and vertical to the image capturing field is simply referred to as symmetrical position. Here, the line segment corresponds to a part of a straight line obtained by projecting an optical axis onto the image capturing field surface.

Figure 10A:
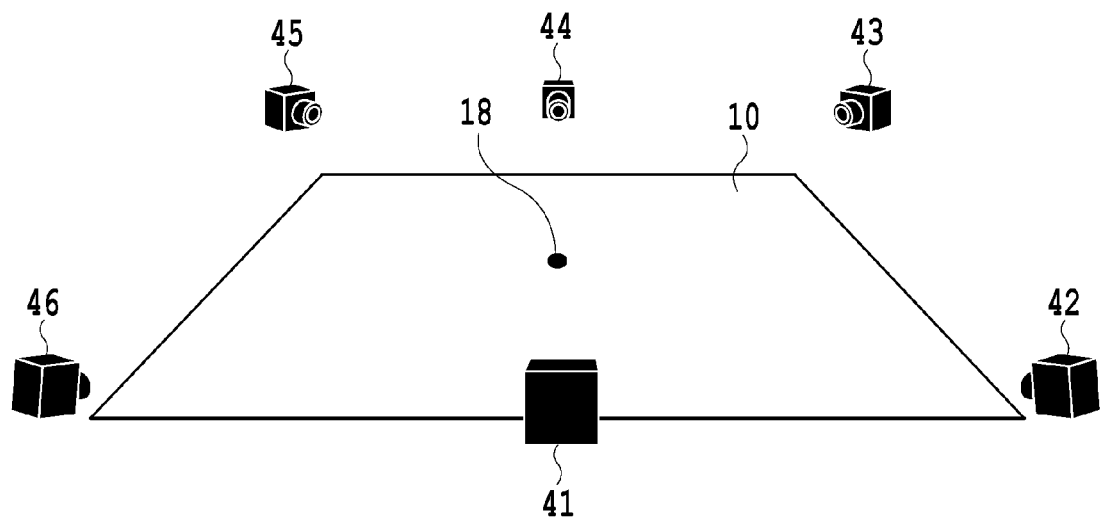
FIG. 10A and FIG. 10B are diagrams showing a configuration example of an image capturing system according to a comparative aspect.
Figure 10B:
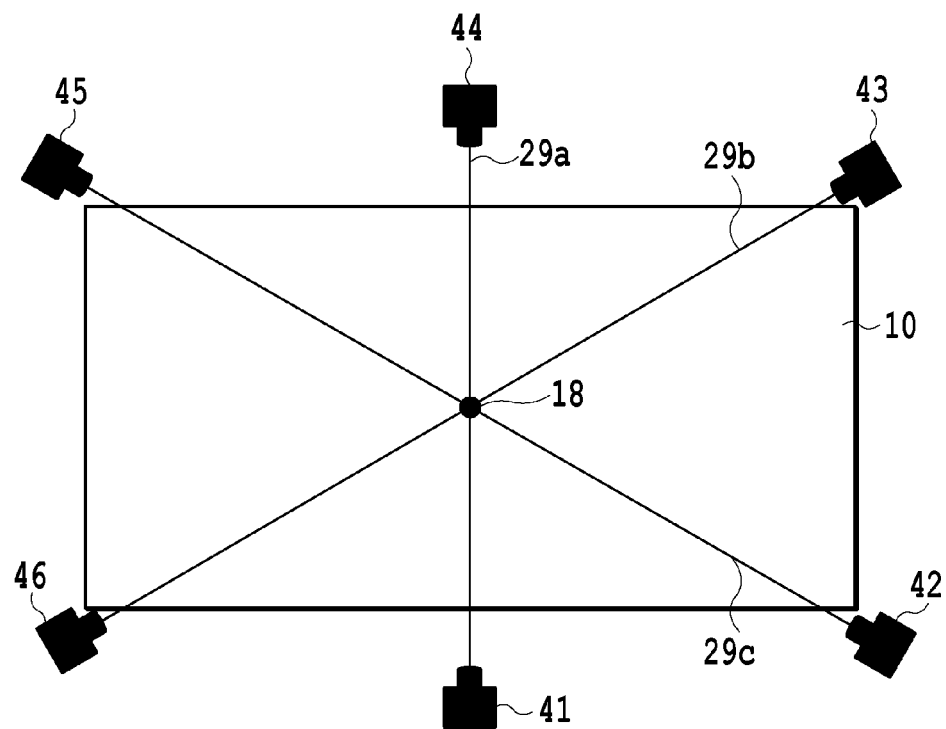

On the other hand, by using FIG. 10A and FIG. 10B, a problem that arises in a case where another camera is arranged at each symmetrical position of all the cameras is explained. FIG. 10A shows a three-dimensional aerial view of an image capturing system in which six cameras are arranged at equal angular intervals with the gaze point 18 being taken as a center and FIG. 10B shows a two-dimensional plan view in a case where the image capturing system is viewed from directly above. In a case of the camera arrangement such as this, as shown in FIG. 10B, at the symmetrical position of a camera 44, a camera 41 is arranged. Further, a camera 43 and a camera 46 area arranged at positions symmetrical with each other. A camera 42 and a camera 45 are arranged similarly. In other words, on a line segment 29a, the camera 44 and the camera 41 are arranged. Further, on a line segment 29b, the camera 43 and the camera 46 are arranged. Furthermore, on a line segment 29c, the camera 42 and the camera 45 are arranged.

Figure 11A:
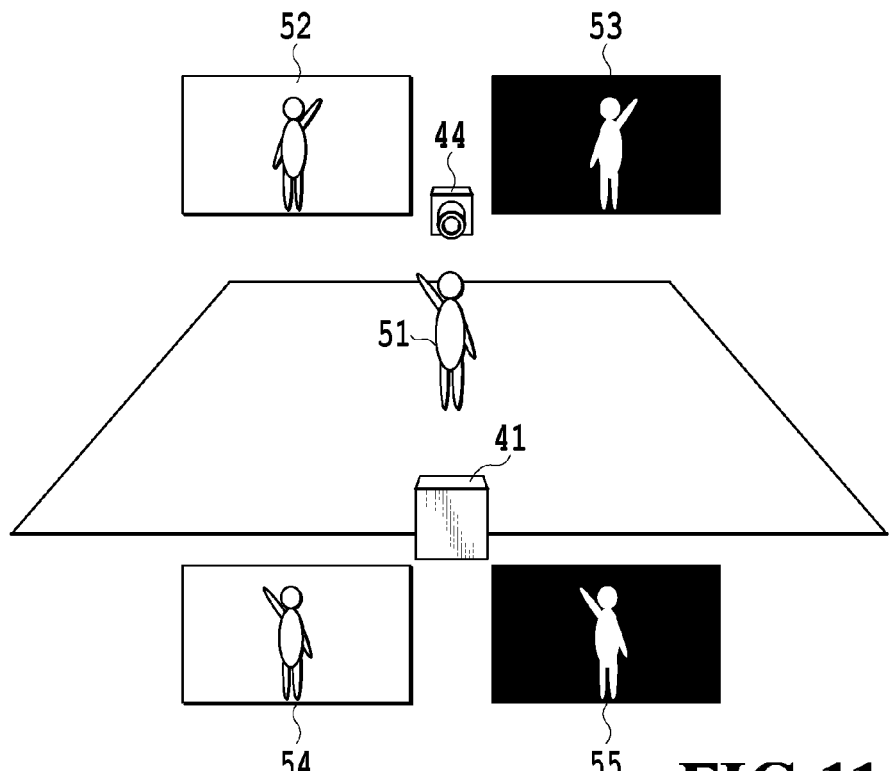
FIG. 11A and FIG. 11B are diagrams for explaining problems of the comparative aspect and effects of the fourth embodiment.

FIG. 11A is a diagram showing captured images acquired by the image capturing system shown in FIG. 10A and FIG. 10B and silhouette images that are object area information indicating the areas of an object 51 within the captured images. Specifically, a captured image 52 acquired by the camera 44 and a silhouette image 53 that is object area information indicating the area of the object 51, which is acquired from the captured image 52, are shown. Further, a captured image 54 acquired by the camera 41 and a silhouette image 55 that is object area information indicating the area of the object 51, which is acquired from the captured image 54, are shown. It is assumed that the viewing angles of the camera 44 and the camera 41 are set to the same viewing angle.

The number of objects 51 included in the silhouette image 53 is the same as the number of objects 51 included in the silhouette image 55. Further, the camera 44 and the camera 41 are arranged at the positions symmetrical with each other, and therefore, the silhouette image 53 whose left and right are reversed is the same as the silhouette image 55. Because of this, in a case where three-dimensional shape data on the object 51 is generated by using the silhouette image of the object 51 by a method, such as the visual hull method, there is not a large difference between information obtained from the silhouette image 53 and information obtained from the silhouette image 55 although there is a difference in that one whose left and right are reversed is the same as the other. In the other words, in a case where three-dimensional shape data is generated, the information obtained from the silhouette image 53 has the same value as that of the information obtained from the silhouette image 55. This is also the same with the silhouette images of the object acquired from the images captured by the camera 43 and the camera 46, respectively. Further, this is also the same with the silhouette images of the object acquired from the images captured by the camera 42 and the camera 45, respectively. Because of this, it can be said that there are three substantially effective silhouette images that are obtained by the image capturing system in FIG. 10A and FIG. 10B.

Figure 11B:
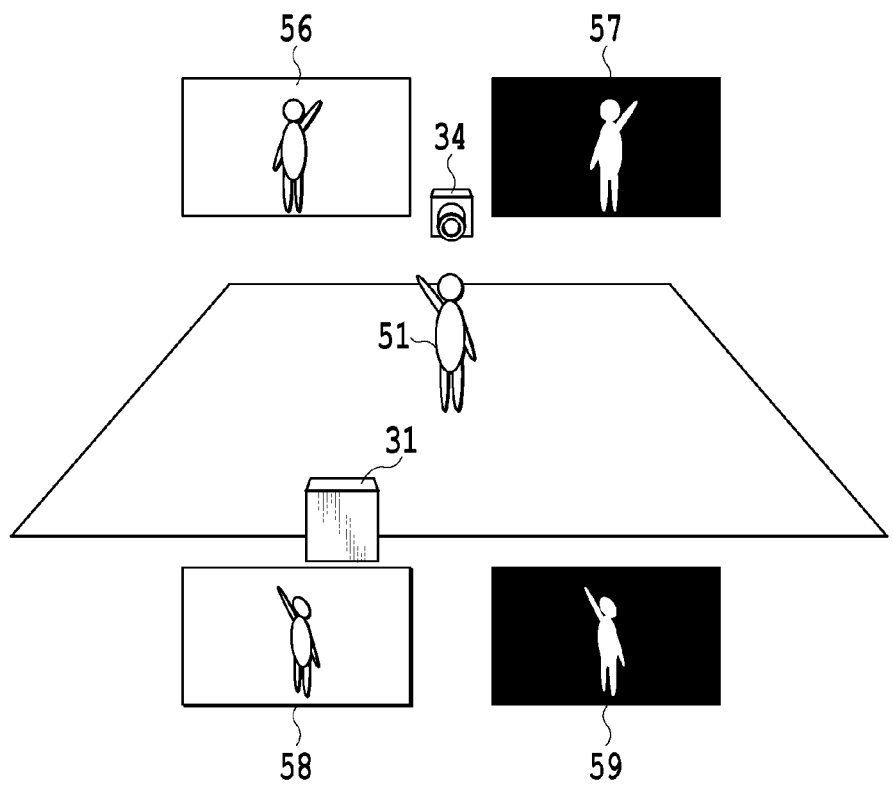

On the other hand, FIG. 11B is a diagram showing captured images acquired by the image capturing system of the present embodiment and silhouette images showing the areas of the object 51 within the captured images. A captured image 56 acquired by the camera 34 and a silhouette image 57 that is object area information indicating the area of the object 51, which is acquired from the captured image 56, are shown. Further, a captured image 58 acquired by the camera 31 and a silhouette image 59 that is object area information indicating the area of the object 51, which is acquired from the captured image 58, are shown. It is assumed that the viewing angles of the camera 34 and the camera 31 are set to the same viewing angle.

The camera 31 is not arranged at the symmetrical position of the camera 34, and therefore, the silhouette image 59 whose left and right are reversed is not the same as the silhouette image 57. Because of this, there are six silhouette images that are obtained by the image capturing system of the present embodiment, the same as the number of cameras. Because of this, despite that the number of cameras is the same as that in the image capturing system in FIG. 10A and FIG. 1B, it is possible to increase the substantially effective silhouette images in number. Because of this, in a case where three-dimensional shape data is generated based on the silhouette images showing the area of the object 51, it is possible to alleviate a reduction in the accuracy of the three-dimensional shape data. Further, it is possible to alleviate a reduction in the image quality of the virtual viewpoint image.

In the present embodiment, explanation is given by taking a case where there are six cameras to be installed as an example, but the number of cameras is not limited to this and an image capturing system including at least two cameras or more may be accepted. The number of cameras, that is, two indicates the minimum number of cameras configuring a combination of cameras that are not arranged at positions symmetrical with each other. Further, in the present embodiment, the example is explained in which each of all the cameras included in the image capturing system is not arranged at the symmetrical position of another camera, but a configuration in which part of cameras are arranged at the symmetrical positions is not excluded.

Further, in the present embodiment, the configuration example is explained in which two cameras are arranged so that one does not face the other with an axis including a predetermined position and vertical to the image capturing field being sandwiched in between. However, in a case where two cameras are in a positional relationship that does not satisfy a positional relationship of symmetry, the two cameras may be in a positional relationship in which the two cameras face each other with an axis including a predetermined position and vertical to the image capturing field being sandwiched in between. That is, in a case where the distances of the two cameras to the axis vertical to the image capturing field and passing the gaze point are different, the two camera may face each other.

Further, in the present embodiment, the case is explained where the viewing angle of the camera is the same as that of another camera arranged at a position closest to the symmetrical position of the camera, but the case is not limited to this. For example, also in a case where the focal lengths of two cameras are the same, on a condition that the two cameras are arranged in a positional relationship of symmetry, there is not a large difference between silhouette images to be obtained, and therefore, the above-described problem arises. In addition to the above, in a case where the camera parameter that determines the camera characteristic, which affects the silhouette image, is the same, the above-described problem arises. The camera parameter such as this is, for example, the size of the imaging sensor, the kind of lens and the like.

In a case where there arises a large difference between pieces of object area information (silhouette images) that are obtained from two cameras whose viewing angles or focal lengths are different, another camera may exist at the symmetrical position with a gaze point being taken as a reference. Further, in the present embodiment, camera parameters may be different between at least two cameras not in a positional relationship of symmetry. Furthermore, camera parameters may be different from one another in all the cameras.

Further, in the present embodiment, the configuration is explained in which another camera does not exist at the symmetrical position with the gaze point being taken as a center on the two-dimensional plane, but the configuration is not limited to this. For example, the camera located at the first floor of a soccer stadium and the camera located at the second floor are different in their height from the image capturing field of the camera in the three-dimensional space, and therefore, as a matter of course, it can be said the two cameras do not exist at symmetrical positions.

Furthermore, in a case where there is a plurality of gaze points, that is, in a case where the image capturing system is divided into different camera groups in which cameras are arranged so as to capture different gaze points, it is sufficient to adopt the camera arrangement described above for each camera group. That is, at the symmetrical position of a camera within one camera group, a camera in another camera group whose gaze point is different may be arranged.

As above, by using a multi-viewpoint image captured by the image capturing system of the present embodiment, it is possible to alleviate a reduction in the accuracy of three-dimensional shape data and to reconfigure a high-image quality virtual viewpoint image.

Fifth Embodiment

In the fourth embodiment, the image capturing system for alleviating a reduction in the accuracy of three-dimensional shape data at virtual viewpoints in a variety of directions is explained. In the present embodiment, an arrangement determination apparatus that determines camera arrangement of the image capturing system explained in the fourth embodiment and a method thereof are explained.

This arrangement determination apparatus is an apparatus that acquires information on the number of a plurality of cameras arranged so as to capture a predetermined position from different directions and positional information on a gaze point and determines arrangement of image capturing devices based on the information, and for example, implemented by the control apparatus 300 described previously. Specifically, arrangement of a plurality of cameras is determined so that another camera is arranged at a position other than a position of two-fold symmetry (symmetrical position) of a camera with an axis passing a gaze point and vertical to the image capturing field being taken as a center. Due to this, it is made possible to determine appropriate camera arrangement by inputting information on the number of cameras and positional information on the gaze point from the outside. Further, it may also be possible for this arrangement determination apparatus to automatically perform camera arrangement or for a person to perform camera arrangement based on the determined arrangement.

Further, it may also be possible for the arrangement determination apparatus to acquire arrangement information indicating arrangement positions of a plurality of cameras, in addition to the information on the number and the positional information on the gaze point, and acquire symmetry information indicating whether or not another camera exists at the symmetrical position based on the information. Then, in a case where symmetry information indicating that a camera exists at the symmetrical position of another camera is acquired, it may also be possible for the arrangement determination apparatus to determine to change the camera arrangement so that a camera does not exist at the symmetrical position.

The arrangement determination apparatus may be an information processing apparatus, such as a PC, which is not included in the image processing system 100. In the following, explanation is given by taking a case as an example where determination of arrangement is performed by another information processing apparatus not included in the image processing system 100. In this case, each camera within the image capturing system is arranged in accordance with the camera arrangement determined by the arrangement determination apparatus, or in a case where each camera has already been arranged, the arrangement position thereof is changed. The actual camera arrangement or the change of the arrangement position may be performed automatically or may be performed by a person. In the following, an example in which the arrangement determination apparatus changes the camera arrangement is explained.

Figure 12:
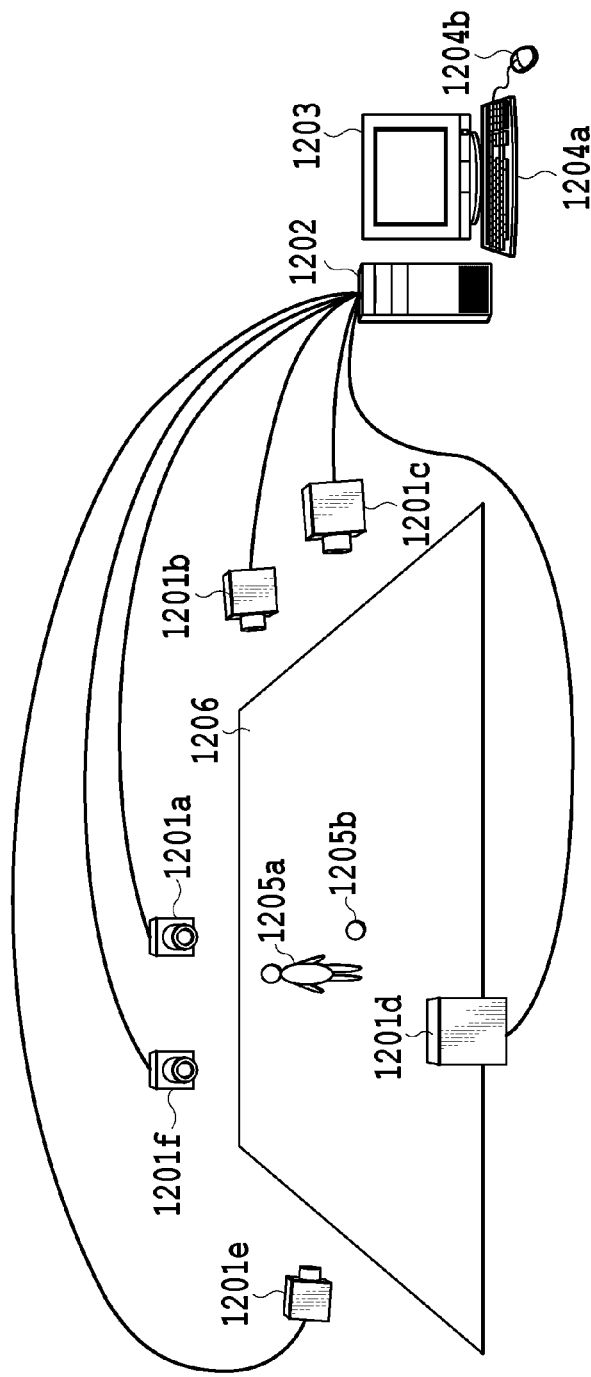
FIG. 12 is a diagram showing an arrangement determination apparatus and an image capturing system according to a fifth embodiment.

In the following, a specific configuration of the present embodiment is described. FIG. 12 is a diagram showing an arrangement determination apparatus 1202 that determines arrangement of each camera in an image capturing system having a plurality of cameras 1201*a* to 1201*f*. The arrangement determination apparatus 1202 is connected with the plurality of cameras in the image capturing system via a network. Information on the number of cameras 1201*a* to 1201*f*, initial arrangement information, orientation information indicating optical axis directions, and positional information on a gaze point are input to the arrangement determination apparatus 1202. Further, based on arrangement information on the cameras 1201*a* to 1201*f* updated by the arrangement determination apparatus 1202, the arrangement of the cameras 1201*a* to 1201*f* is changed. The arrangement determination apparatus 1202 is connected with a display device 1203 and input devices 1204*a*, 1204*b* via a network. The display device 1203 displays, for example, initial arrangement information indicating the initial camera arrangement position and updated arrangement information, and displays a change amount of the camera whose arrangement position is changed, the direction thereof and the like. The input devices 1204*a*, 1204*b* receive an input of the initial arrangement information indicating the initial camera arrangement position, receives an input of the change amount specified by a user.

Each of the cameras 1201*a* to 1201*f* is arranged so as to surround objects 1205*a* and 1205*b* arranged in an area on an approximate plane and capture the objects 1205*a* and 1205*b* from different directions. The object 1205*a* represents a person (player) on an image capturing field 1206, which is a game ground, and the object 1205*b* represents a ball.

Figure 13A:
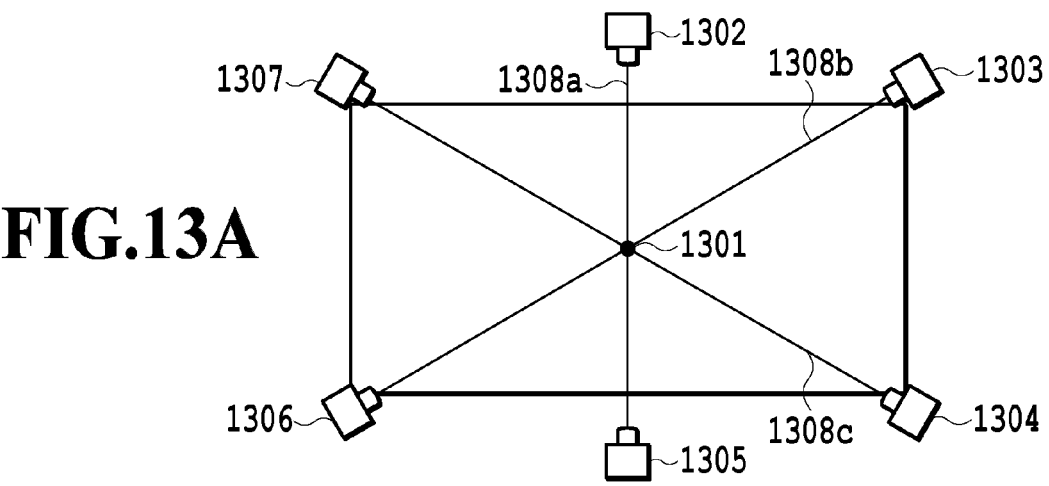
FIG. 13A to FIG. 13C are diagrams explaining a concept of a method of determining camera arrangement according to the fifth embodiment.
Figure 13B:
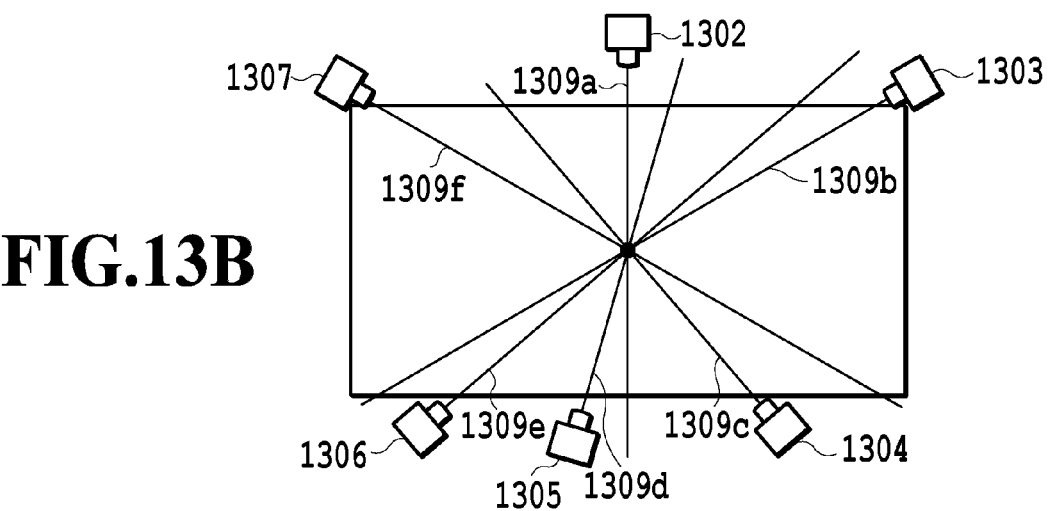
Figure 13C:
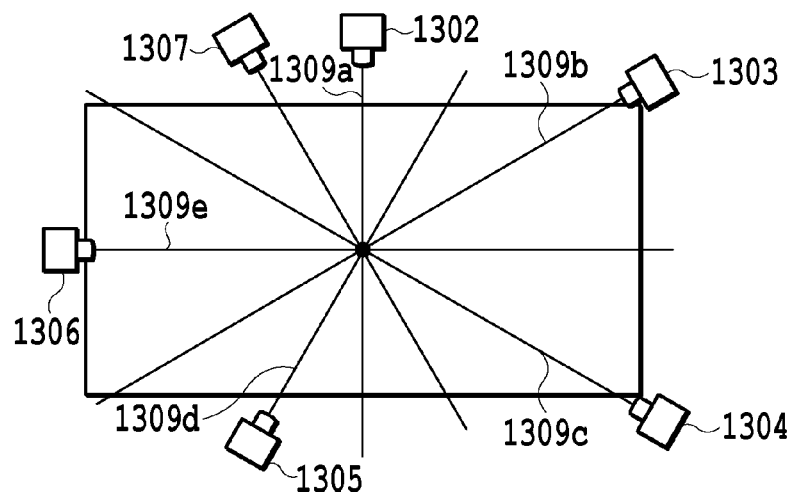

Next, an outline of a method of determining the camera position, which is performed in the present embodiment, is explained by using FIG. 13A to FIG. 13C. First, the arrangement determination apparatus 1202 acquires information on the number of a plurality of cameras 1302 to 1307 included in an image capturing system shown in FIG. 13A, initial arrangement information indicating the initial arrangement position, and orientation information indicating optical axis directions. Further, the arrangement determination apparatus 1202 acquires positional information on a gaze point 1301 of each camera within the image capturing system. After that, the arrangement determination apparatus 1202 determines whether or not a combination of the cameras exists, which is in a positional relationship of symmetry with an axis including the gaze point 1301 and vertical to the image capturing field being taken as a center based on the information on the number, the initial arrangement information, the orientation information, and the positional information on the gaze point. Then, for the combination of the camera 1302 and the camera 1305 determined to be in a positional relationship of symmetry, the arrangement determination apparatus 1202 determines a direction in which the camera position is shifted in order to change the camera position (direction of change) and a shift amount (change amount) so that those cameras are no longer in a positional relationship of symmetry. Further, also for the combination of the camera 1303 and the camera 1306 and the combination of the camera 1304 and the camera 1307, the arrangement determination apparatus 1202 determines a direction in which the camera position is shifted in order to change the camera position (direction of change) and a shift amount (change amount) so that those cameras are no longer in a positional relationship of symmetry.

For example, in a case where the camera 1304 to the camera 1306 are changed to the positions as shown in FIG. 13B, as described above, six line segments 1309*a* to 1309*f* connecting each camera and the gaze point 1301 are generated. By the image capturing system with the camera arrangement such as this, it is possible to acquire six substantially effective silhouette images. On the other hand, with the camera arrangement in FIG. 13A, there are only three line segments 1308*a* to 1308*c* connecting each camera and the gaze point 1301, and therefore, it is possible to acquire only three effective silhouette images. Because of this, compared to the case of FIG. 13A, in FIG. 13B, it is possible to improve the accuracy of three-dimensional shape data and the image quality of a virtual viewpoint image.

However, in the camera arrangement in FIG. 13B, no camera is arranged between the camera 1303 and the camera 1304 and between the camera 1306 and the camera 1307, and therefore, it is not possible to acquire a captured image. Because of this, between the camera 1303 and the camera 1304 and between the camera 1306 and the camera 1307, it is not possible to acquire a silhouette image. Consequently, it may also be possible to determine the direction in which the camera is shifted and the shift amount thereof so that the line segments connecting each of the cameras whose position has been changed and the gaze point 1301 are arranged substantially at equal angles with the gaze point 1301 being taken as a center. For example, as shown in FIG. 13C, an image capturing system is constructed by changing the positions of the camera 1305 to the camera 1307 from the camera arrangement in FIG. 13A so that the line segments 1309*a* to 1309*f* connecting each camera and the gaze point 1301 are dispersed substantially evenly. By the image capturing system such as this, it is possible to more alleviate a reduction in the accuracy of three-dimensional shape data and in the image quality of a virtual viewpoint image. In the present embodiment, the method of determining the camera position is explained by taking a case as an example where the image quality of the entire object is improved, but this is not limited. For example, in a case where the direction from the virtual viewpoint is limited, it may also be possible to determine the camera whose position is to be changed and the change amount thereof so that the above-described line segments are even in the area in the limited direction.

Figure 14:
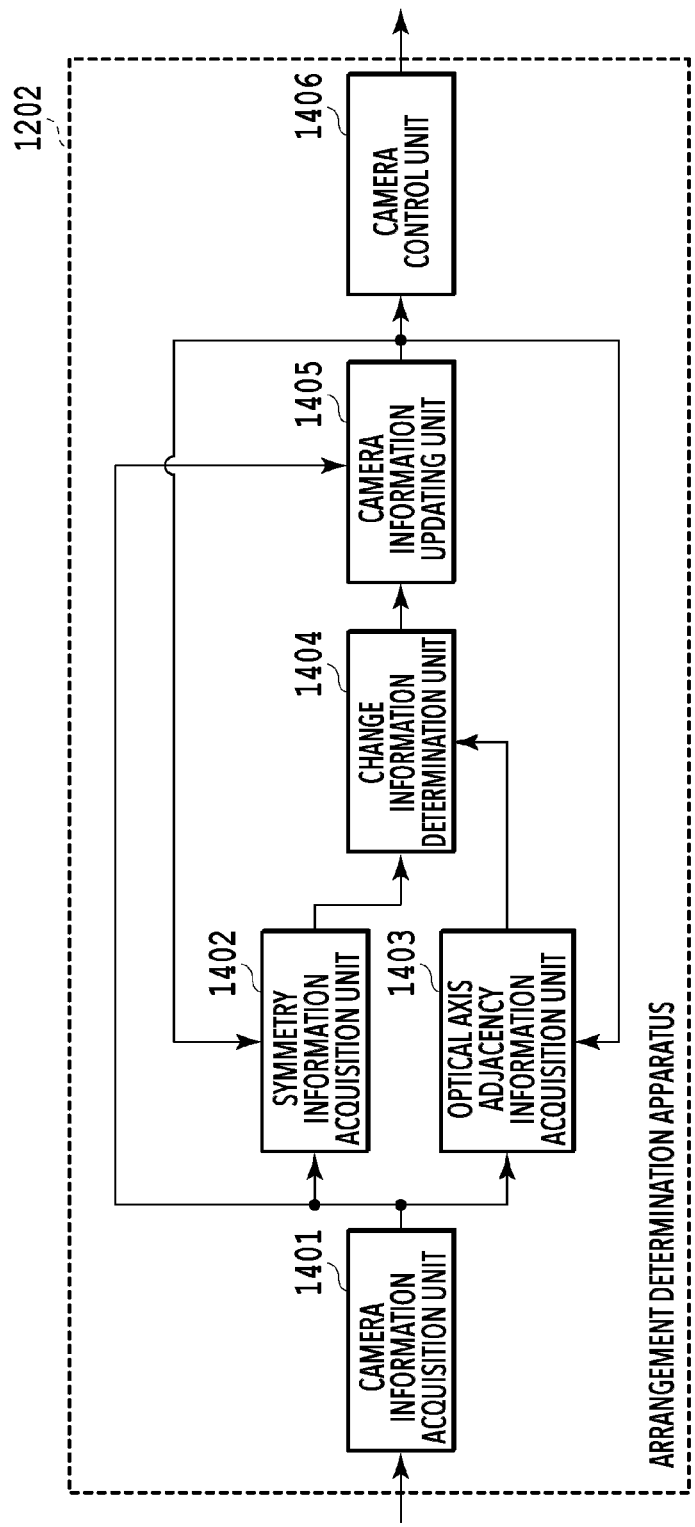
FIG. 14 is a block diagram showing a function configuration of an arrangement determination apparatus according to the fifth embodiment.

In the following, processing that is performed in the arrangement determination apparatus 1202 of the present embodiment is explained with reference to FIG. 14 and FIG. 15. FIG. 14 is a block diagram showing an example of the configuration of the arrangement determination apparatus 1202 of the present embodiment. The arrangement determination apparatus 1202 shown in FIG. 14 has a camera information acquisition unit 1401, a symmetry information acquisition unit 1402, an optical axis adjacency information acquisition unit 1403, a change information determination unit 1404, a camera information updating unit 1405, and a camera control unit 1406.

Figure 15:
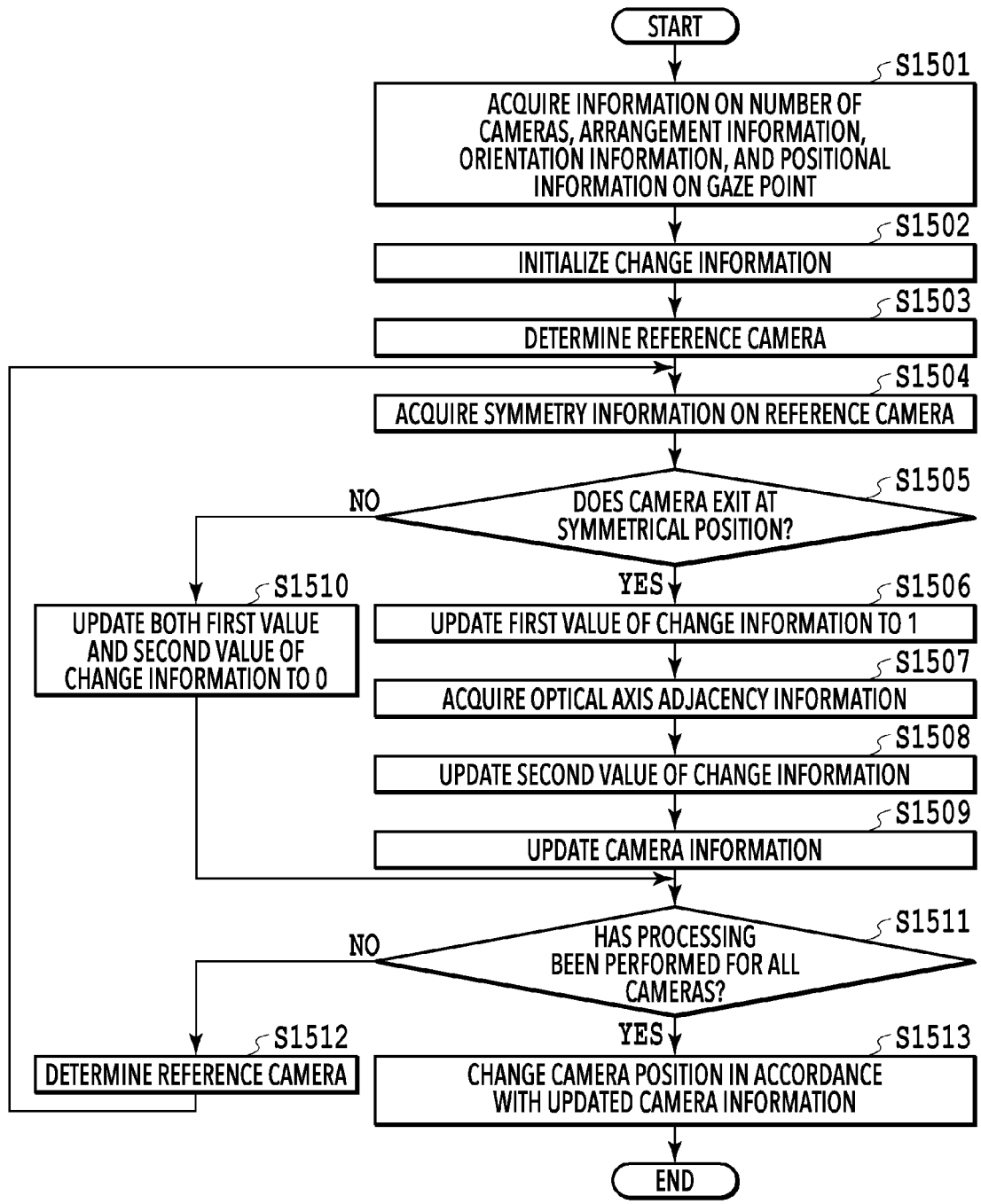
FIG. 15 is a flowchart showing a flow of processing to determine camera arrangement according to the fifth embodiment.

Further, FIG. 15 shows an example of a flow of processing in the arrangement determination apparatus 1202 shown in FIG. 14. In the following, a flow of processing performed by each constituent unit is explained. Symbol "S" in the following explanation represents a step.

The camera information acquisition unit 1401 acquires camera information, such as the number of cameras, initial camera arrangement information, camera orientation information, and positional information on the camera gaze point. The symmetry information acquisition unit 1402 calculates a symmetry degree with another camera for each camera based on the camera information and calculates symmetry information. The symmetry degree is an index indicating whether another camera exists at a position of two-fold symmetry of a camera with an axis including the gaze point and vertical to the image capturing field being taken as a center, or how close a position at which another camera exists is to the position of two-fold symmetry. The symmetry degree and the symmetry information will be described later.

The optical axis adjacency information acquisition unit 1403 acquires optical axis adjacency information by calculating an optical axis adjacency degree for each camera by using the camera information. The optical axis adjacency degree indicates adjacency between the optical axis of the own camera and the optical axis of another camera and is defined by an index indicating the angle between straight lines obtained by projecting vectors indicating the optical axes of the cameras, respectively, onto a two-dimensional plane. The optical axis adjacency degree and the optical axis adjacency information will be described later.

The change information determination unit 1404 determines whether or not to change the initial camera arrangement based on the symmetry information. Further, the change information determination unit 1404 determines the change amount of the camera position that is determined to be changed based on the optical axis adjacency information. It may also be possible for a user to input the change amount by using the input devices 1204a, 1204b.

The camera information updating unit 1405 updates the camera information that is output from the camera information acquisition unit 1401 or the change information determination unit 1404. Specifically, the camera information updating unit 1405 updates the contents determined by the change information determination unit 1404, for example, such as the information on the camera whose position is changed and the change amount thereof, the camera whose position is not changed and the like, and outputs the final processing results to the camera control unit 1406. Further, the temporary processing results on the way of the processing are input to the symmetry information acquisition unit 1402 and the optical axis adjacency information acquisition unit 1403. It may also be possible to output the contents to a display control unit (not shown schematically) located within the arrangement determination apparatus 1202 or the display device 1203 for the display control unit to display the contents so that the contents are displayed in the display device 1203. In this case, it may also be possible for a person to change the camera arrangement position in accordance with the contents displayed in the display device 1203.

The camera control unit 1406 changes the positions of the plurality of cameras included in the image capturing system based on the updated camera information that is output by the camera information updating unit 1405.

At S1501, the camera information acquisition unit 1401 acquires camera information including information on the number of cameras included in the image capturing system, initial arrangement information, orientation information, and positional information on the gaze point. The camera information is information that represents the position of each camera by the position pi (pxi, pyi, pzi) in the coordinate space and the orientation of each camera by the vector vi [vxi, vyi, vzi] by defining three-dimensional coordinate axes whose x-axis and y-axis represent the bottom (image capturing field) of the image capturing space and whose z-axis represents the height thereof. Here, i is the identification number of each of the plurality of installed cameras. The contents of the camera information are not limited to those described above and may be information on the coordinate position of each camera and the coordinate position of the gaze point. Further, the representation method of the positional information and orientation information on the camera is not limited to this and a representation method capable of specifying the position and orientation of a camera may be accepted. Furthermore, in the present embodiment, the initial camera position may be determined automatically so that the angle between the optical axes is even with the gaze point being taken as a center, or the camera position specified by a user via the input devices 1204a, 1204b may be acquired as the initial camera position. The camera information acquisition unit 1401 outputs the acquired initial camera arrangement information and orientation information to the symmetry information acquisition unit 1402, the optical axis adjacency information acquisition unit 1403, and the camera information updating unit 1405 as the camera information.

At S1502, the change information determination unit 1404 initializes change information. The change information is information indicating a value indicating whether or not to change the camera position as a first value and a change amount indicating an amount of change in a case where the camera position is changed as a second value.

At S1503, the camera information updating unit 1405 determines the reference camera that is the target for which whether or not the camera information is updated is determined among the plurality of cameras included in the image capturing system. Normally, the reference camera is determined in order from the camera whose number i identifying the camera described above is the smallest, but this is not limited. For example, it may also be possible to determine a camera selected randomly from among the plurality of cameras to be the reference camera or determine the reference camera by another method.

At S1504, the symmetry information acquisition unit 1402 calculates symmetry information for each camera by using the camera information input from the camera information acquisition unit 1401 or the camera information updating unit 1405. At this time, the camera information input from the camera information updating unit 1405 is used preferentially. In the following, a calculation method of symmetry information is explained specifically. That is, the calculation method is performed by, for example, a procedure as in 1) to 3) below.

1) Calculate a direction vector (hereinafter, called optical axis-projected vector) vi [vpi, vqi] for each camera, which is obtained by projecting a vector indicating the optical axis direction of each camera onto a two-dimensional plane and performing normalization. Here, i is the number that identifies each camera and i=1 to 6.

2) Calculate a symmetry degree with another camera. Specifically, calculate an inner vector vo·vj of an optical axis-projected vector vo [vpo, vqo] of the reference camera and an optical axis-projected vector vj [vpj, vqj] of a camera other than the reference camera. Here, o indicates the identification number of the reference camera and j indicates the identification number of a camera other than the reference camera. For example, in a case where i=1, o=1 and j=2 to 6.

3) Acquire symmetry information by using the symmetry degree calculated in 2) described above. Specifically, acquire the maximum value as the symmetry information on the reference camera among the values obtained by reversing the signs of the inner products vo·vj with another camera, whose values are negative. In a case where this symmetry information is 1, it is indicated that another camera exists at the symmetrical position of the reference camera. In a case where this symmetry information is not 1, it is indicated that another camera does not exist at the symmetrical position of the reference camera. That is, the symmetry information is information indicating whether or not another camera exists at the symmetrical position of the camera.

The symmetry information acquisition unit 1402 outputs the acquired symmetry information to the change information determination unit 1404. In the present embodiment, the calculation of the symmetry information is performed by using the two-dimensional plane and the inner product, but this is not limited and it may also be possible to use another method capable of determining whether or not the reference camera and another camera are in a positional relationship of symmetry and determining the degree thereof.

At S1505, the change information determination unit 1404 determines whether or not there exists a camera that is located at the symmetrical position of the reference camera with the gaze point being taken as a reference by using the symmetry information acquired at S1504. In the present embodiment, in a case where the symmetry information on the reference camera is 1, it is determined that another camera exists at the symmetrical position as described above (YES at S1505) and the processing advances to S1506. However, this is not limited and for example, it may also be possible to determine that another camera exists at the symmetrical position in a case where the symmetry information is 0.8 or more. That is, it may be permitted to determine that another camera exists at the symmetrical position also in a case where the camera exists substantially at the symmetrical position in place of determining that another camera exists at the symmetrical position only in a case where the camera exists at the completely symmetrical position of the reference camera. Further, in the present embodiment, by using the symmetry information calculated by the two-dimensional vectors, the determination of whether or not another camera exists at the symmetrical position of the reference camera is performed, but this is not limited and it may also be possible to perform determination based on a three-dimensional positional relationship including the height direction. In that case, it may happen that it is determined that the camera located at the symmetrical position in the two-dimensional positional relationship is the camera that does not exist at the symmetrical position in a case where the height is different.

At S1506, the change information determination unit 1404 updates the first value of the change information to 1. That the first value is 1 indicates that the camera position is changed.

Further, in a case the determination results at S1505 are NO, that is, it is determined that another camera does not exist at the symmetrical position of the reference camera, the processing advances to S1510. Then, at S1510, the change information determination unit 1404 updates both the first value and the second value of the change information to 0. That the first value is 0 indicates that the camera position is not changed. Further, that the second value is 0 indicates that the change amount is 0. After the updating, the processing advances to S1511.

Next, at S1507, the optical axis adjacency information acquisition unit 1403 acquires an optical axis adjacency degree by using the camera information input from the camera information acquisition unit 1401 or the camera information updating unit 1405. At this time, the camera information input from the camera information updating unit 1405 is used preferentially. In the following, an acquisition method of an optical axis adjacency degree is described specifically. That is, the acquisition method is performed by, for example, a procedure as in 1) to 3) below.

1) Calculate the optical axis-projected vector vi [vpi, vqi] of each camera for each camera. Here, i is the number that identifies each camera and i=1 to 6. This procedure is the same as in 1) of the calculation method of symmetry information and it may also be possible to acquire this information from the symmetry information acquisition unit 1402.

2) Calculate the inner product vo·vj and a cross product vo×vj of the optical axis-projected vector vo [vpo, vqo] of the reference camera and the optical axis-projected vector vj [vpj, vqj] of a camera other than the reference camera. Here, o indicates the identification number of the reference camera and j indicates the identification number of a camera other than the reference camera. For example, in a case where i=1, o=1 and j=2 to 6. It may also be possible to acquire this inner product vo·vj from the symmetry information acquisition unit 1402.

3) Calculate a value obtained by dividing the cross product vo×vj by the inner product vo·vj from the values of the inner product vo·vj and the cross product vo×vj with another vector, which are calculated in 2) described above, and take the value as the optical axis adjacency degree of the camera. This optical axis adjacency degree is an index indicating the angle between the straight lines obtained by projecting the vectors indicating the optical axes of the cameras onto the two-dimensional plane. In the present embodiment, by using the two-dimensional plane, the inner product, and the cross product, the optical axis adjacency degree is calculated, but this is not limited and another method may be used. The optical axis adjacency information acquisition unit 1403 outputs the information integrating the optical axis adjacency degrees of the reference camera and the other cameras to the change information determination unit 1404 as the optical axis adjacency information.

At step S1508, the change information determination unit 1404 determines the change amount at the time of changing the position of the reference camera from the optical axis adjacency information acquired at S1506 and updates the second value of the change information. Specific explanation is given below. That is, this is performed by, for example, a procedure as in 1) to 3) (or 1) to 3')) below.

1) Extract a value cp whose optical axis adjacency degree is positive and the minimum and a value cm whose optical axis adjacency degree is negative and the minimum from the optical axis adjacency information.

2) Determine whether or not a camera whose optical axis adjacency degree is 0 exists other than the reference camera from the optical axis adjacency information.

3) In a case where it is determined that a camera whose optical axis adjacency degree is 0 exists other than the reference camera from the optical axis adjacency information, compare the absolute value of the minimum value cp whose optical axis adjacency degree is positive and the absolute value of the minimum value cm whose optical axis adjacency degree is negative and extract a value c whose absolute value is the minimum. Then, by using the detected value c, calculate a middle angle θ=arctan(c/2) of the optical axis of the reference camera and the most adjacent optical axis.

3') In a case where it is determined that a camera whose optical axis adjacency degree is 0 does not exist other than the reference camera, calculate the middle angle θ by (arctan(cp)−arctan(cm)/2+arctan(cp).

The change information determination unit 1404 updates the second value of the change information indicating the change amount of the reference camera to the value of the middle angle θ calculated as described above. Then, the change information determination unit 1404 outputs the updated change information to the camera information updating unit 1405. Because of this, the larger the angle between the straight lines obtained by projecting the vectors indicating the optical axes of the two cameras onto the two-dimensional plane respectively, the smaller the change amount becomes.

In the present embodiment, the change amount is calculated by using the arctangent, but this is not limited and it may also be possible to user another method capable of calculating the angle between the optical axis of the reference camera and the optical axis of another camera or the movement amount. Further, it may also be possible to make use the change amount specified by a user arbitrarily and use the change amount as the second value of the change information. Furthermore, as the second value of the change information, the angle is used, but this is not limited and it may also be possible to use another method, such as the distance and the vector in the three-dimensional space.

At S1509, the camera information updating unit 1405 updates the camera information on the reference camera, which is input from the camera information acquisition unit 1401, by using the change information input from the change information determination unit 1404. In a case where the first value in the change information is 1, the information on the position and orientation of the reference camera is updated. In the present embodiment, the positional information pi (pxi, pyi, pzi) on the reference camera is updated to the position to which the reference camera has been rotated with the gaze point being taken as a reference by an amount corresponding to the angle indicated by the second value of the change information. Further, by using the updated positional information pi and the gaze point, the orientation vector vi of the reference camera is updated. In the present embodiment, the camera information is updated so as to move the reference camera by rotating the reference camera in accordance with the second value of the change information, but this is not limited. For example, in a case where there is a limit to the position at which the camera can be arranged or the like, it may also be possible to update the camera information so as to move the reference camera to a position closest to the position within the limit from the position to which the reference camera has been moved simply. In a case where the first value in the change information is 0, the information on the position and orientation of the reference camera in the camera information is not updated.

At S1511, the camera information updating unit 1405 determines whether the determination of whether or not to update the camera information by taking all the cameras included in the image capturing system as the reference camera has been performed. In a case of determining that the determination has been performed for all the cameras (YES at S1511), the camera information updating unit 1405 outputs the updated camera information to the camera control unit 1406. Further, in accordance with the necessity, the camera information updating unit 1405 outputs the updated camera information to a display control unit (not shown schematically) configured to control the display of the display device 1203.

On the other hand, in a case where the determination results are NO at S1511, the processing advances to S1512 and the camera information updating unit 1405 changes the reference camera. After that, the processing returns to S1504. At S1512, in the present embodiment, a camera that has not been selected as the reference camera so far is selected as a new reference camera. In a case of a camera having already been selected as the reference camera and whose camera information has been updated, for the camera, by using the updated camera information thereon, the symmetry degree and the optical axis adjacency degree in a case where another camera is taken as the reference camera are calculated.

At S1513, the camera control unit 1406 changes the positions of the plurality of cameras included in the image capturing system in accordance with the updated camera information input from the camera information updating unit 1405.

The above is the explanation of the determination apparatus and the processing method thereof in the present embodiment. According to the configuration explained above, it is possible to construct an image capturing system that generates a high-image quality virtual viewpoint image irrespective of the number of cameras included in the image capturing system and the direction of the virtual viewpoint.

Sixth Embodiment

In the fifth embodiment, the method is explained which determines the camera positions so that the line segments connecting the cameras and the gaze point are dispersed substantially at equal intervals on the entire circumference of the image capturing space. In the present embodiment, an arrangement determination apparatus and a method thereof are explained, which determine the camera arrangement so that the cameras themselves also exist substantially at equal intervals on the entire circumference, in addition to the line segments connecting the cameras and the gaze point. Specifically, the camera positions are determined based on also a camera adjacency degree indicating an adjacency degree between cameras, in addition to the optical axis adjacency degree explained in the fifth embodiment. In the following, the outline and the meaning of the determination method of camera arrangement performed in the present embodiment are explained by using FIG. 16.

Figure 16A:
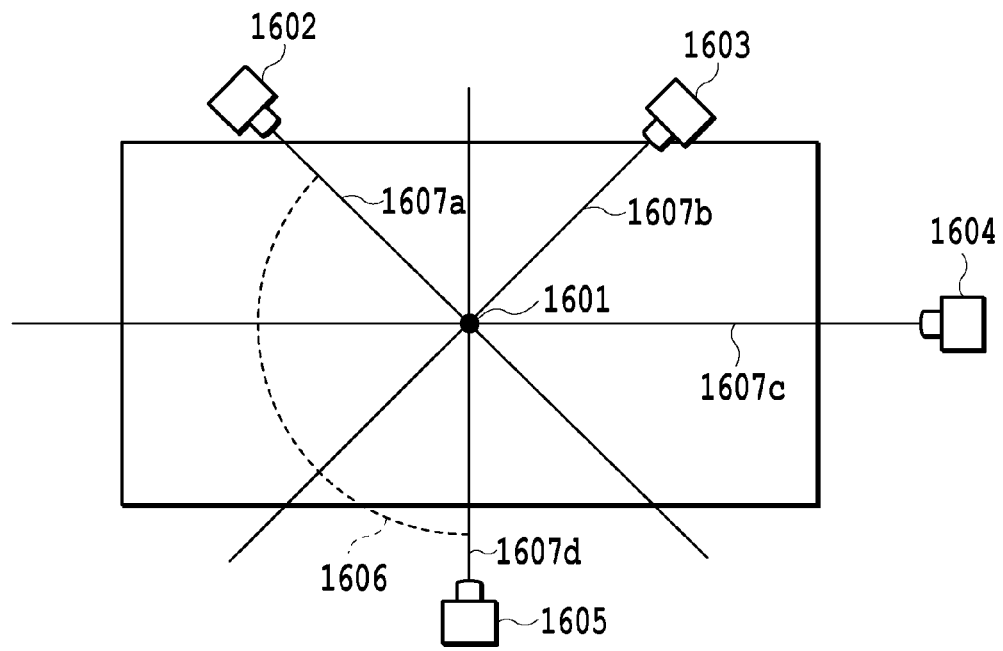
FIG. 16A and FIG. 16B are diagrams explaining a concept of a method of determining camera arrangement according to a sixth embodiment.

Here, explanation is given by taking a case of an image capturing system in which four cameras are included as an example. FIG. 16A shows a case where cameras are arranged so that only line segments 1607*a* to 1607*d* connecting each of cameras 1602 to 1605 and a gaze point 1601 and their extensions are located substantially at equal angular intervals on the entire circumference. In FIG. 16A, as well as optical axes exist in a variety of directions on the entire circumference, silhouette images in a variety of directions can be obtained, and therefore, it is possible to generate three-dimensional shape data with a high accuracy. However, an angle 1606 between the optical axes of the camera 1602 and the camera 1605 is large and no camera is arranged between the camera 1602 and the camera 1605. Because of this, there is a possibility that an area occurs in which neither the camera 1602 nor the camera 1605 can perform image capturing for an image capturing-target object. As a result of that, even though the accuracy of the three-dimensional shape data is high, the texture information used for rendering does not exist or the number of pieces of texture information becomes small. This texture information affects the quality of a virtual viewpoint image, and therefore, in a case where a virtual viewpoint is set between the camera 1602 and the camera 1605, the image quality of the virtual viewpoint image becomes low.

Figure 16B:
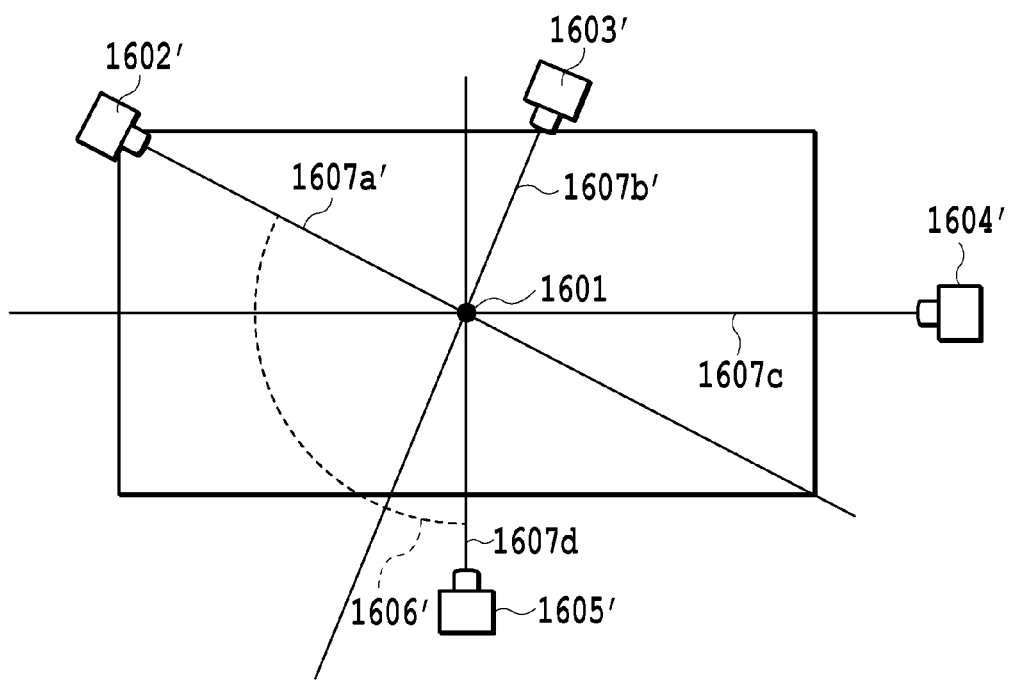

In contrast to this, in FIG. 16B, each of cameras 1602' to 1605' is not arranged in a positional relationship of symmetry with the gaze point 1601 being taken as a reference and the cameras themselves are arranged substantially at equal angular intervals on the entire circumference. Compared to the camera arrangement in FIG. 16A, in the camera arrangement in FIG. 16B, the dispersion degree of the optical axes of each of the cameras 1602' to 1605' on the entire circumference is low, but an angle 1606' between the camera 1602' and the camera 1605' becomes small. That is, the area in which image capturing cannot be performed becomes small compared to the camera arrangement in FIG. 16A, and therefore, it is possible to reduce missing of texture information on an object, which is used at the time of generation of a virtual viewpoint image. As a result of that, it is made possible to improve the image quality of a virtual viewpoint image. Because of that, in the present embodiment, as shown in FIG. 16B, the image capturing system is configured in which the cameras are arranged by taking into consideration not only the dispersion degree of the optical axes but alto the dispersion degree of the cameras.

In the example described above, the case where there are four cameras is explained, but the case is not limited to this and it is possible to apply the present embodiment also to a case of an arbitrary number of cameras. Further, in the example described above, the case is explained where none of all the cameras in the image capturing system satisfies the positional relationship of symmetry, but the case is not limited to this and it is possible to permit the image capturing system to include cameras that satisfy the positional relationship of symmetry for reasons, such as the restriction on installation.

Figure 17:
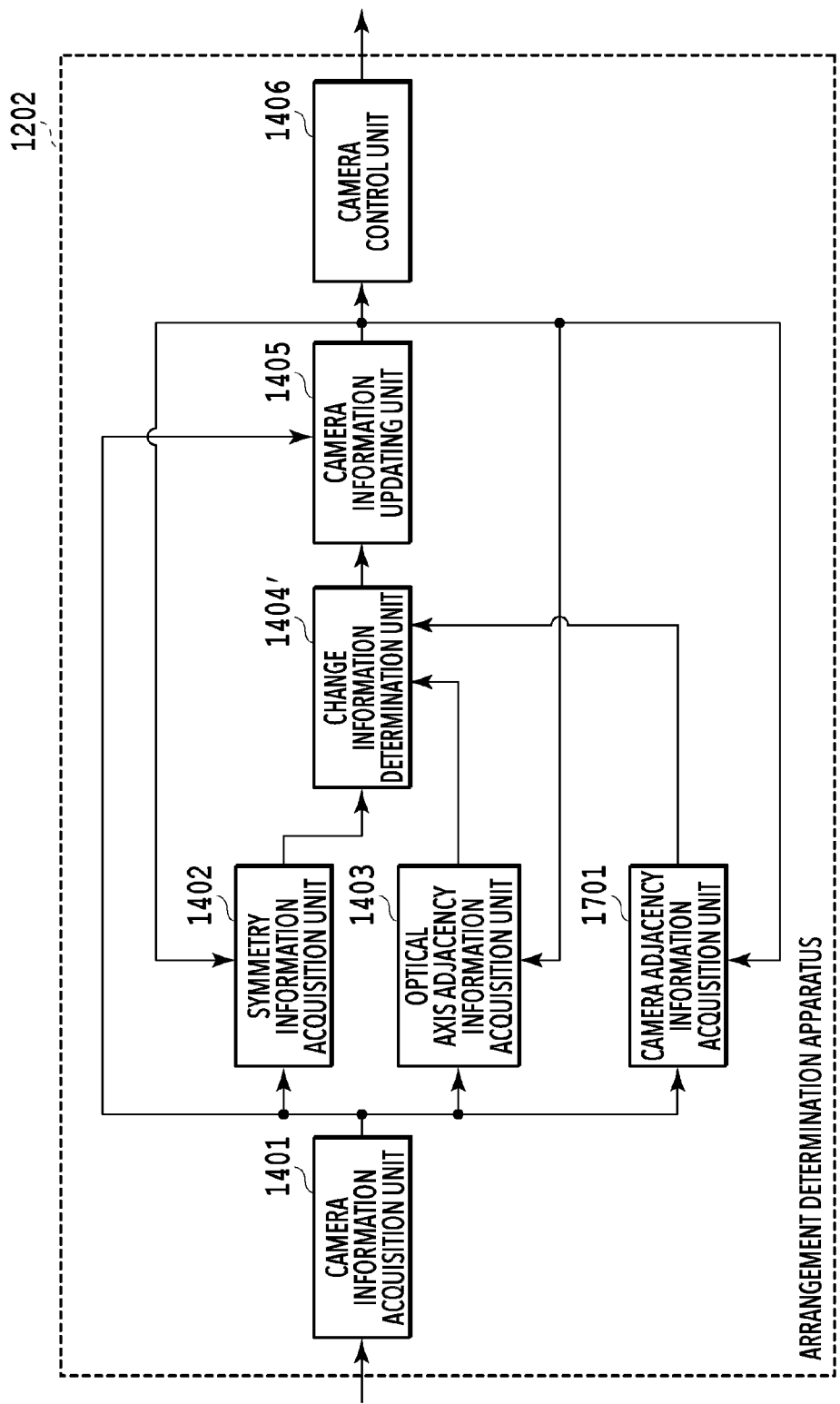
FIG. 17 is a block diagram showing a function configuration of an arrangement determination apparatus according to the sixth embodiment.

In the following, the determination apparatus that determines the camera arrangement and the processing method thereof of the present embodiment are explained with reference to FIG. 17 and FIG. 18. FIG. 17 is a block diagram showing an example of the configuration of the arrangement determination apparatus 1202 according to the present embodiment. The arrangement determination apparatus 1202 of the present embodiment has the camera information acquisition unit 1401, the symmetry information acquisition unit 1402, the optical axis adjacency information acquisition unit 1403, a change information determination unit 1404', the camera information updating unit 1405, and the camera control unit 1406 and further has a camera adjacency information acquisition unit 1701. The camera adjacency information acquisition unit 1701 acquires the camera adjacency degree indicating the shortness of the distance between the cameras based on the camera information and generates camera adjacency information by integrating the camera adjacency degree for each camera. The camera adjacency degree is an index indicating the distance between the image capturing devices. Further, the change information determination unit 1404' differs from the change information determination unit 1404 in the fifth embodiment in determining the change amount of the camera arrangement position based on also the camera adjacency information, in addition to the optical axis adjacency degree.

Figure 18:
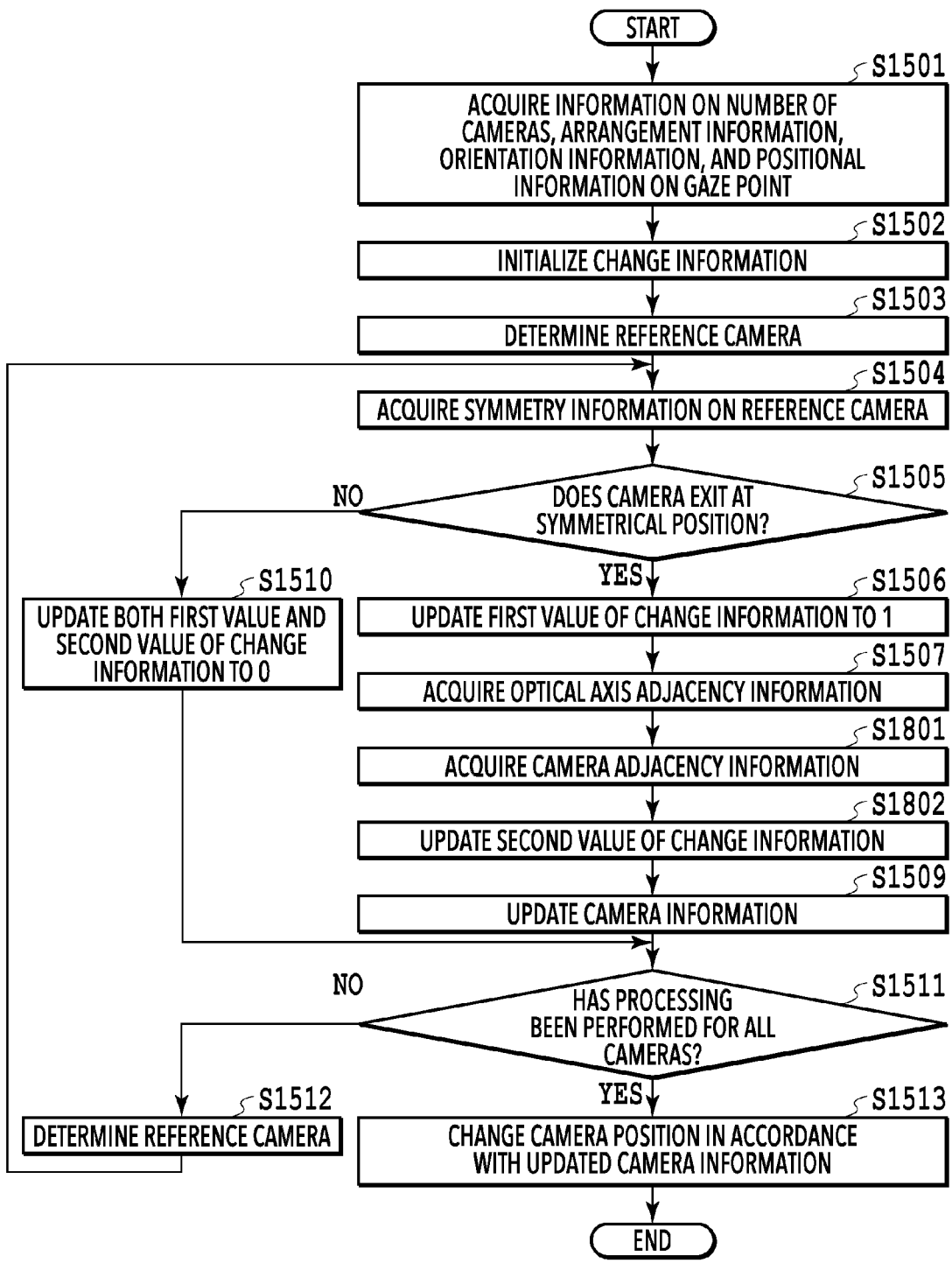
FIG. 18 is a flowchart showing a flow of processing to determine camera arrangement according to the sixth embodiment.

Further, FIG. 18 is a diagram showing an example of a flow of processing in the arrangement determination apparatus 1202 according to the present embodiment. In the following, a flow of processing that is performed by each constituent unit is explained. Explanation of the same configuration and processing as those of the fifth embodiment is omitted by attaching the same symbols as those of the fifth embodiment. Specifically, the processing up to S1507 and at S1509 and subsequent steps is the same as that of the fifth embodiment.

At S1801, the camera adjacency information acquisition unit 1701 acquires the camera adjacency information indicating the distance between the reference camera and another camera by using the camera information input from the camera information acquisition unit 1401 or the camera information updating unit 1405. At this time, the camera information input from the camera information updating unit 1405 is used preferentially. In the following an acquisition method of camera adjacency information is described specifically.

In the present embodiment, as the camera adjacency information, two values are stored for each reference camera. A first value indicates a camera adjacency degree indicating the shortness of the distance to the reference camera and a second value indicates the direction with respect to the reference camera. In the present embodiment, as the second value, one of two kinds of positive (1) and negative (0) is stored. However, the representation method of the camera adjacency information is not limited to the above and it may also be possible to use a method that indicates how close another camera is to the reference camera, or the direction thereof. In the following, a calculation method of camera adjacency information is explained specifically. That is, the calculation method is performed by, for example, a procedure as in 1) to 3) below.

1) Calculate the optical axis-projected vector vi [vpi, vqi] of each camera for each camera. Here, i is the number that identifies each camera and i=1 to 6. This procedure is the same as 1) of the calculation method of symmetry information and it may also be possible to acquire this information from the symmetry information acquisition unit 1402.

2) Calculate a camera adjacency degree. Specifically, calculate the inner product vo·vj and the cross product vo×vj of the optical axis-projected vector vo [vpo, vqo] of the reference camera and the optical axis-projected vector vj [vpj, vqj] of a camera other than the reference camera. Here, o indicates the identification number of the reference camera and j indicates the identification number of a camera other than the reference camera. For example, in a case where i=1, o=1 and j=2 to 6. It may also be possible to acquire this inner product vo·vj from the symmetry information acquisition unit 1402. Further, it may also be possible to acquire the cross product vo×vj from the optical axis adjacency information acquisition unit 1403.

3) Take the value of the inner product vo·vj calculated in 2) described above as the first value of the camera adjacency information. Further, determine the second value of the camera adjacency information in accordance with positive/negative of the value of the cross product vo×vj. In a case where the value of the cross product vo×vj is positive, determine the second value of the camera adjacency information to be 1 and in a case where the value of the cross product vo×vj is negative, determine the second value of the camera adjacency information to be 0.

In the present embodiment, by using the two-dimensional plane, the inner product, and the cross product, the calculation of the camera adjacency degree is performed, but this is not limited and another method may be used. The camera adjacency information acquisition unit 1701 outputs the information that integrates the acquired camera adjacency degree of each camera for all the cameras to the change information determination unit 1404'.

At S1802, the change information determination unit 1404' determines the change amount at the time of changing the reference camera position from the optical axis adjacency information input from the optical axis adjacency information acquisition unit 1403 and the camera adjacency information integrating the camera adjacency degrees of all the cameras, which is input from the camera adjacency information acquisition unit 1701. Then, the change information determination unit 1404' updates the second value of the change information. This is described specifically below. This is performed by, for example, a procedure as in 1) to 6) below.

1) Extract the value cp whose optical axis adjacency degree is positive and the minimum and the value cm whose optical axis adjacency degree is negative and the minimum from the optical axis adjacency information.

2) Similarly, acquire a value dp whose second value of the camera adjacency information is 1 and whose first value is the minimum and a value dm whose second value is 0 and whose first value is the minimum from the camera adjacency information.

3) Calculate $\theta d=(\arctan(dp)-\arctan(dm))/2$ indicating a middle of the angle formed by the reference camera and the adjacent camera from the acquired dp and dm.

4) Determine whether or not a camera whose optical axis adjacency degree is 0 exists other than the reference camera from the optical axis adjacency information.

5) In a case where it is determined that a camera whose optical axis adjacency degree is 0 exists other than the reference camera from the optical axis adjacency information, compare the absolute value of the value cp whose optical axis adjacency degree is positive and the minimum and the absolute value of the value cm whose optical axis adjacency degree is negative and the minimum and extract the value c whose absolute value is the minimum. Then, by using the detected value c, calculate a middle angle $\theta c=\arctan(c/2)$ between the optical axis of the reference camera and the most adjacent optical axis. On the other hand, in a case where it is determined that a camera whose optical axis adjacency degree is 0 does not exist other than the reference camera, calculate the middle angle $\theta c$ by $(\arctan(cp)-\arctan(cm))/2$.

6) Calculate the middle angle $\theta$ between $\theta c$ and $\theta d$ by $(\theta c - \theta d)/2 + \theta d$.

The change information determination unit 1404' updates the second value of the change information indicating the change amount of the reference camera to the value of the middle angle $\theta$ calculated as described above. The change information determination unit 1404' outputs the updated change information to the camera information updating unit 1405. In the present embodiment, the calculation of the change amount is performed by using the arctangent, but this is not limited and it may also be possible to use another method capable of calculating the angle between the optical axis of the reference camera and the adjacent optical axis, or the movement amount. Further, it may also be possible to make use of a change amount specified by a user arbitrarily and use the change amount as the second value of the change information. Furthermore, as the second value of the change information, the angle is used, but this is not limited and it may also be possible to use another method, such as the distance and the vector in the three-dimensional space.

The greater the distance between cameras, the smaller the change amount of the camera arrangement position becomes.

Further, in the present embodiment, the change amount is determined by using the camera adjacency information and the optical axis adjacency information in an equal ratio, but this is not limited and it may also be possible to determine the middle angle $\theta$ by a weighted sum, such as $(\alpha+\theta c-\beta \times \theta d)/2+\theta d$. In this case, by setting $\alpha$ larger than $\beta$, priority is given to the equality degree of optical axes and on the contrary, by setting $\beta$ larger than $\alpha$, priority is given to equality degree between cameras.

The above is the explanation of the determination apparatus and the processing method thereof in the present embodiment. According to the configuration explained above, it is possible to construct an image capturing system that generates a high-image quality virtual viewpoint image irrespective of the number of cameras included in the image capturing system or the direction of the virtual viewpoint.

It is possible to implement the present disclosure also by processing to supply programs implementing one or more functions of the above-described embodiments to a system or an apparatus via a network or a storage medium and cause one or more processors in a computer of the system or the apparatus to read and execute the programs. Further, it is also possible to implement the present disclosure by a circuit (for example, ASIC) that implements one or more functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to generate a high-quality virtual viewpoint image with a limited number of cameras.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:
1. A determination apparatus comprising:
one or more memories storing instructions; and
one or more processors executing the instructions to:
  acquire image capturing device information for specifying positions and orientations of a plurality of image capturing devices capturing a specific position in an image capturing space from different directions;
  acquire positional information on the specific position;
  acquire number information on a number of image capturing devices caused to have a different parameters among the plurality of image capturing devices;

specify, for each image capturing device of the plurality of image capturing devices, a symmetry degree of an own image capturing device and another image capturing device; and determine, based on the acquired image capturing device information, the acquired positional information, the acquired number information, and the specified symmetry degree for each image capturing device, parameters specifying characteristics of the plurality of image capturing devices, a parameter affecting resolution of an object in an image captured by a first image capturing device being different from a parameter affecting a resolution of an object in an image captured by a second image capturing device, and the second image capturing device being installed at a position of two-fold symmetry of a position of the second image capturing device with respect to an axis passing the specific position and vertical to an image capturing field or a position closest to the position of two-fold symmetry of the position of the first image capturing device.

2. The image capturing system according to claim 1, wherein the parameter affecting a resolution of an object in an image is a viewing angle.

3. The image capturing system according to claim 1, wherein the parameter affecting a resolution of an object in an image is a focal length.

4. The image capturing system according to claim 1, wherein the parameter affecting a resolution of an object in an image is a size of an imaging sensor.

5. The image capturing system according to claim 1, wherein the parameter affecting a resolution of an object in an image is a kind of imaging sensor.

6. The image capturing system according to claim 1, wherein the parameter affecting a resolution of an object in an image is a kind of lens.

7. The determination apparatus according to claim 1, wherein
the determination is performed based on a two-dimensional direction vector or three-dimensional direction vector representing a line-of-sight direction of each image capturing device.

8. The determination apparatus according to claim 1, wherein
the symmetry degree takes a maximum value in a case where the own image capturing device and the other image capturing device are in a positional relationship of two-fold symmetry with respect to an axis passing the specific position and vertical to an image capturing field.

9. A determination apparatus comprising:
one or more memories storing instructions; and
one or more processors executing the instructions to:
  acquire image capturing device information for specifying positions and orientations of a plurality of image capturing devices capturing a specific position in an image capturing space from different directions;
  acquire positional information on the specific position;
  acquire information on a number of image capturing devices caused to have a different parameters among the plurality of image capturing devices;
  specify, for each image capturing device of the plurality of image capturing devices, a symmetry degree of an own image capturing device and another image capturing device;

specify, for each image capturing device of the plurality of image capturing devices, a proximity degree of a base line extending from an own image capturing device and passing the specific position and a base line extending from the another image capturing device facing the own image capturing device with the specific position being sandwiched in between; and determine, based on the acquired image capturing device information, the acquired positional information, the acquired number information, the specified symmetry degree for each image capturing device, and the specified proximity degree for each image capturing device, parameters specifying characteristics of the plurality of image capturing devices, a parameter affecting a resolution of an object in an image captured by a first image capturing device being different from a parameter affecting a resolution of an object in an image captured by a second image capturing device, and the second image capturing device being installed at a position of two-fold symmetry of a position of the second image capturing device with respect to an axis passing the specific position and vertical to an image capturing field or a position closest to the position of two-fold symmetry of the position of the first image capturing device.

10. The determination apparatus according to claim 9, wherein
the narrower an interval between a base line of an own image capturing device, the base line being taken as a reference, and a base line of another adjacent image capturing device, the higher the proximity degree is.

11. The determination apparatus according to claim 9, wherein
a reference image capturing device is determined among the plurality of image capturing devices based on the symmetry degree;
at least two image capturing devices existing in close proximity to a position a predetermined reference angle distant from a position of the determined reference image capturing device is detected; and
an image capturing device whose parameter is made different is determined based on the proximity degree from at least two detected image capturing devices.

12. The determination apparatus according to claim 11, wherein
in order all image capturing devices that can be the reference image capturing device are determined among the plurality of image capturing devices as the reference image capturing device; and
a configuration is determined so that arrangement of image capturing devices whose parameters are made different is the most even within a range in which virtual viewpoint setting is possible.

13. The determination apparatus according to claim 1, wherein the one or more processors further execute the instructions to change a parameter of an image capturing device determined to be an image capturing device whose parameter is made different.

14. A determination method of an image capturing device in an image capturing system for generating a virtual viewpoint image, wherein
the image capturing system comprises a plurality of image capturing devices capturing a specific position from different directions, the plurality of image capturing devices including at least one pair of image capturing devices including:

a first image capturing device; and a second capturing device installed at a position of two-fold symmetry of a position of the first image capturing device with respect to an axis passing the specific position and vertical to an image capturing field, or a position closest to the position of two-fold symmetry of the position of the first image capturing device, and the determination method comprises:

acquiring image capturing device information indicating positions and orientations of the plurality of image capturing devices;

acquiring number information on a number of image capturing devices caused to have a different parameters among the plurality of image capturing devices;

specifying, for each image capturing device of the plurality of image capturing devices, a symmetry degree of an own image capturing device and another image capturing device;

determining the first image capturing device and a second image capturing device among the plurality of image capturing devices; and setting, based on the acquired image capturing device information, the acquired positional information, the acquired number information and the specified symmetry degree for each image capturing device, parameters to the first image capturing device and the second image capturing device, a parameter affecting a resolution of an object in a captured image by the first image capturing device being different from a parameter affecting a resolution of an object in a captured image by the second image capturing device.

15. A non-transitory computer readable storage medium storing a program for causing a computer to perform a determination method of an image capturing device in an image capturing system for generating a virtual viewpoint image, wherein the image capturing system comprises a plurality of image capturing devices capturing a specific position from different directions, the plurality of image capturing devices including at least one pair of image capturing devices including:

a first image capturing device; and a second capturing device installed at a position of two-fold symmetry of a position of the first image capturing device with respect to an axis passing the specific position and vertical to an image capturing field, or a position closest to the position of two-fold symmetry of the position of the first image capturing device, and the arrangement determination method comprises:

acquiring image capturing device information indicating positions and orientations of the plurality of image capturing devices;

acquiring number information on a number of image capturing devices caused to have a different parameters among the plurality of image capturing devices;

specifying, for each image capturing device of the plurality of image capturing devices, a symmetry degree of an own image capturing device and another image capturing device;

determining the first image capturing device and the second image capturing device among the plurality of image capturing devices; and setting, based on the acquired image capturing device information, the acquired positional information, the acquired number information and the specified symmetry degree for each image capturing device, parameters to the first image capturing device and the second image capturing device, a parameter affecting a resolution of an object in a captured image by the first image capturing device being different from a parameter affecting a resolution of an object in a captured image by the second image capturing device.

16. A determination apparatus comprising:

one or more memories storing instructions; and one or more processors executing the instructions to:

acquire image capturing device information for specifying positions and orientations of a plurality of image capturing devices capturing a specific position in an image capturing space from different directions;

acquire positional information on the specific position;

acquire number information on a number of image capturing devices caused to have a different parameters among the plurality of image capturing devices;

specify, for each image capturing device of the plurality of image capturing devices, a symmetry degree of an own image capturing device and another image capturing device; and determine, based on the acquired image capturing device information, the acquired positional information, the acquired number information and specified symmetry degree for each image capturing device, parameters specifying characteristics of the plurality of image capturing devices, a parameter affecting an image capturing range of a first image capturing device being is different from a parameter affecting an image capturing range of a second image capturing device, and the second image capturing device being installed at a position of two-fold symmetry of a position of the second image capturing device with respect to an axis passing the specific position and vertical to an image capturing field or a position closest to the position of two-fold symmetry of the position of the first image capturing device.

17. A determination apparatus comprising:

one or more memories storing instructions; and one or more processors executing the instructions to:

acquire image capturing device information for specifying positions and orientations of a plurality of image capturing devices capturing a specific position in an image capturing space from different directions;

acquire positional information on the specific position;

acquire information on a number of image capturing devices caused to have a different parameters among the plurality of image capturing devices;

specify, for each image capturing device of the plurality of image capturing devices, a symmetry degree of an own image capturing device and another image capturing device;

specify, for each image capturing device of the plurality of image capturing devices, a proximity degree of a base line extending from an own image capturing device and passing the specific position and a base line extending from the another image capturing device facing the own image capturing device with the specific position being sandwiched in between; and determine, based on the acquired image capturing device information, the acquired positional information, the acquired number information, the specified symmetry degree for each image capturing device and the specified proximity degree for each image capturing device, parameters specifying characteristics of the plurality of image capturing devices, a parameter affecting an image capturing range of a first image capturing device being different from a parameter affecting an image capturing range of a second image capturing device, and the second image capturing device being installed at a position of two-fold symmetry of a position of the second image capturing device with respect to an axis passing the specific position and vertical to an image capturing field or a position closest to the position of two-fold symmetry of the position of the first image capturing device.

18. A determination method of an image capturing device in an image capturing system for generating a virtual viewpoint image, wherein the image capturing system comprises a plurality of image capturing devices capturing a specific position from different directions, the plurality of image capturing devices including at least one pair of image capturing devices including:

a first image capturing device; and a second capturing device installed at a position of two-fold symmetry of a position of the first image capturing device with respect to an axis passing the specific position and vertical to an image capturing field, or a position closest to the position of two-fold symmetry of the position of the first image capturing device, and the determination method comprises:

acquiring image capturing device information indicating positions and orientations of the plurality of image capturing devices;

acquire number information on a number of image capturing devices caused to have a different parameters among the plurality of image capturing devices;

specify, for each image capturing device of the plurality of image capturing devices, a symmetry degree of an own image capturing device and another image capturing device;

determining the first image capturing device and a second image capturing device among the plurality of image capturing devices; and setting, based on the acquired image capturing device information, the acquired positional information, the acquired number information and the specified symmetry degree for each image capturing device, parameters to the first image capturing device and the second image capturing device, a parameter affecting an image capturing range of the first image capturing device being different from a parameter affecting an image capturing range of the second image capturing device.

19. A non-transitory computer readable storage medium storing a program for causing a computer to perform a determination method of an image capturing device in an image capturing system for generating a virtual viewpoint image, wherein the image capturing system comprises a plurality of image capturing devices capturing a specific position from different directions, the plurality of image capturing devices including at least one pair of image capturing devices including:

a first image capturing device; and a second capturing device installed at a position of two-fold symmetry of a position of the first image capturing device with respect to an axis passing the specific position and vertical to an image capturing field, or a position closest to the position of two-fold symmetry of the position of the first image capturing device, and the determination method comprises:

acquiring image capturing device information indicating positions and orientations of the plurality of image capturing devices;

acquire number information on a number of image capturing devices caused to have a different parameters among the plurality of image capturing devices;

specify, for each image capturing device of the plurality of image capturing devices, a symmetry degree of an own image capturing device and another image capturing device;

determining the first image capturing device and a second image capturing device among the plurality of image capturing devices; and setting, based on the acquired image capturing device information, the acquired positional information, the acquired number information and the specified symmetry degree for each image capturing device, parameters to the first image capturing device and the second image capturing device, a parameter affecting an image capturing range of the first image capturing device being different from a parameter affecting an image capturing range of the second image capturing device.

* * * * *